(12) United States Patent
Dostert et al.

(10) Patent No.: US 7,600,217 B2
(45) Date of Patent: *Oct. 6, 2009

(54) SOCKET-LIKE COMMUNICATION API FOR JAVA

(75) Inventors: Jan Dostert, Nussloch (DE); Christian Fleischer, Mannheim (DE)

(73) Assignee: SAP AG, Walldorf (DE)

( * ) Notice: Subject to any disclaimer, the term of this patent is extended or adjusted under 35 U.S.C. 154(b) by 265 days.

This patent is subject to a terminal disclaimer.

(21) Appl. No.: 11/012,803

(22) Filed: Dec. 14, 2004

(65) Prior Publication Data
US 2006/0129981 A1 Jun. 15, 2006

(51) Int. Cl.
G06F 9/44 (2006.01)

(52) U.S. Cl. .......................... 717/114; 707/9; 707/100; 707/102; 707/103; 718/100

(58) Field of Classification Search ................ None
See application file for complete search history.

(56) References Cited

U.S. PATENT DOCUMENTS

| | | | |
|---|---|---|---|
| 5,331,318 A | 7/1994 | Montgomery | |
| 5,566,302 A | 10/1996 | Khalidi et al. | |
| 5,566,315 A | 10/1996 | Milillo et al. | |
| 5,617,570 A | 4/1997 | Russell et al. | |
| 5,682,328 A | 10/1997 | Roeber et al. | |
| 5,692,193 A * | 11/1997 | Jagannathan et al. | 718/106 |
| 5,710,909 A | 1/1998 | Brown et al. | |
| 5,745,778 A | 4/1998 | Alfieri | |
| 5,805,790 A | 9/1998 | Nota et al. | |
| 5,905,868 A | 5/1999 | Baghai et al. | |
| 5,909,540 A | 6/1999 | Carter et al. | |
| 5,926,834 A | 7/1999 | Carlson et al. | |
| 5,944,781 A | 8/1999 | Murray | |
| 5,951,643 A | 9/1999 | Shelton et al. | |
| 5,999,179 A | 12/1999 | Kekic et al. | |
| 6,038,571 A | 3/2000 | Numajiri et al. | |
| 6,065,006 A | 5/2000 | deCarmo et al. | |

(Continued)

FOREIGN PATENT DOCUMENTS

EP 0 459 931 A2 12/1991

(Continued)

OTHER PUBLICATIONS

White Paper: 'Using Rules-based Object Caching', spiritsoft/spiritcache 4.0 2004.

(Continued)

Primary Examiner—Truong Cam Y
Assistant Examiner—Shyue Jiunn Hwa
(74) Attorney, Agent, or Firm—Blakely Sokoloff Taylor & Zafman

(57) ABSTRACT

A system and method are described for performing data processing using shared memory and socket-like application programming interface. In one embodiment, a plurality of handles is employed and associated with a plurality of processes. The plurality of handles may serve as communication end-points for communication of data. Further, an application programming interface is employed to present the plurality of handles as the application programming interface for sockets for facilitating the communication of data compatible with a programming language. The data is communicated between the plurality of processes via the socket-like plurality of handles.

9 Claims, 15 Drawing Sheets

U.S. PATENT DOCUMENTS

| | | | |
|---|---|---|---|
| 6,075,938 A | 6/2000 | Bugnion et al. | |
| 6,092,171 A | 7/2000 | Relph | |
| 6,115,712 A | 9/2000 | Islam et al. | |
| 6,115,721 A | 9/2000 | Nagy | |
| 6,167,423 A | 12/2000 | Chopra et al. | |
| 6,199,179 B1 | 3/2001 | Kauffman et al. | |
| 6,216,212 B1 | 4/2001 | Challenger et al. | |
| 6,256,712 B1 | 7/2001 | Challenger et al. | |
| 6,272,598 B1 | 8/2001 | Arlitt et al. | |
| 6,282,566 B1 | 8/2001 | Lee, Jr. et al. | |
| 6,295,582 B1 | 9/2001 | Spencer | |
| 6,330,709 B1 | 12/2001 | Maynard et al. | |
| 6,336,170 B1 | 1/2002 | Dean et al. | |
| 6,345,386 B1 | 2/2002 | Delo et al. | |
| 6,349,344 B1 | 2/2002 | Sauntry et al. | |
| 6,356,529 B1 | 3/2002 | Zarom | |
| 6,356,946 B1 | 3/2002 | Clegg et al. | |
| 6,412,045 B1 | 6/2002 | DeKoning et al. | |
| 6,415,364 B1 * | 7/2002 | Bauman et al. | 711/155 |
| 6,424,828 B1 | 7/2002 | Collins et al. | |
| 6,425,057 B1 | 7/2002 | Cherkasova et al. | |
| 6,438,654 B1 | 8/2002 | Elko et al. | |
| 6,467,052 B1 | 10/2002 | Kaler et al. | |
| 6,519,594 B1 | 2/2003 | Li | |
| 6,553,377 B1 | 4/2003 | Eschelbeck et al. | |
| 6,587,937 B1 | 7/2003 | Jensen et al. | |
| 6,591,347 B2 | 7/2003 | Tischler et al. | |
| 6,601,112 B1 | 7/2003 | O'Rourke et al. | |
| 6,615,253 B1 * | 9/2003 | Bowman-Amuah | 709/219 |
| 6,640,244 B1 * | 10/2003 | Bowman-Amuah | 709/207 |
| 6,643,802 B1 | 11/2003 | Frost et al. | |
| 6,651,080 B1 | 11/2003 | Liang et al. | |
| 6,654,948 B1 | 11/2003 | Konuru et al. | |
| 6,658,478 B1 | 12/2003 | Singhal et al. | |
| 6,681,251 B1 | 1/2004 | Leymann et al. | |
| 6,687,702 B2 | 2/2004 | Vaitheeswaran et al. | |
| 6,738,977 B1 | 5/2004 | Berry et al. | |
| 6,760,911 B1 * | 7/2004 | Ye | 719/314 |
| 6,766,419 B1 | 7/2004 | Zahir et al. | |
| 6,769,022 B1 | 7/2004 | DeKoning et al. | |
| 6,772,409 B1 | 8/2004 | Chawla et al. | |
| 6,795,856 B1 | 9/2004 | Bunch | |
| 6,799,202 B1 | 9/2004 | Hankinson et al. | |
| 6,829,679 B2 | 12/2004 | DeSota et al. | |
| 6,854,114 B1 | 2/2005 | Sexton et al. | |
| 6,879,995 B1 | 4/2005 | Chinta et al. | |
| 6,970,925 B1 | 11/2005 | Springmeyer et al. | |
| 7,003,770 B1 | 2/2006 | Pang et al. | |
| 7,024,512 B1 | 4/2006 | Franaszek et al. | |
| 7,024,695 B1 | 4/2006 | Kumar et al. | |
| 7,058,957 B1 | 6/2006 | Nguyen | |
| 7,089,566 B1 * | 8/2006 | Johnson | 719/328 |
| 7,124,170 B1 | 10/2006 | Sibert | |
| 7,127,472 B1 | 10/2006 | Enokida et al. | |
| 7,127,713 B2 | 10/2006 | Davis et al. | |
| 7,130,891 B2 | 10/2006 | Bernardin et al. | |
| 7,149,741 B2 * | 12/2006 | Burkey et al. | 707/100 |
| 7,155,512 B2 | 12/2006 | Lean et al. | |
| 7,165,239 B2 | 1/2007 | Hejlsberg et al. | |
| 7,191,170 B2 | 3/2007 | Ganguly et al. | |
| 7,194,761 B1 | 3/2007 | Champagne | |
| 7,203,769 B2 | 4/2007 | Schnier | |
| 7,216,160 B2 | 5/2007 | Chintalapati et al. | |
| 7,237,140 B2 | 6/2007 | Nakamura et al. | |
| 7,246,167 B2 | 7/2007 | Kalmuk et al. | |
| 7,254,634 B1 | 8/2007 | Davis et al. | |
| 7,296,267 B2 | 11/2007 | Cota-Robles et al. | |
| 7,302,423 B2 * | 11/2007 | De Bellis | 707/3 |
| 7,373,647 B2 | 5/2008 | Kalmuk et al. | |
| 7,386,848 B2 | 6/2008 | Cavage et al. | |
| 7,395,338 B2 | 7/2008 | Fujinaga | |
| 2001/0029520 A1 * | 10/2001 | Miyazaki et al. | 709/200 |
| 2002/0046325 A1 | 4/2002 | Cai et al. | |
| 2002/0049767 A1 | 4/2002 | Bennett | |
| 2002/0052914 A1 | 5/2002 | Zalewski et al. | |
| 2002/0073283 A1 | 6/2002 | Lewis et al. | |
| 2002/0078060 A1 | 6/2002 | Garst et al. | |
| 2002/0093487 A1 | 7/2002 | Rosenberg | |
| 2002/0099753 A1 | 7/2002 | Hardin et al. | |
| 2002/0129264 A1 | 9/2002 | Rowland et al. | |
| 2002/0133805 A1 | 9/2002 | Pugh et al. | |
| 2002/0147888 A1 * | 10/2002 | Trevathan | 711/133 |
| 2002/0169926 A1 | 11/2002 | Pinckney et al. | |
| 2002/0174097 A1 | 11/2002 | Rusch et al. | |
| 2002/0181307 A1 | 12/2002 | Fifield et al. | |
| 2002/0198953 A1 | 12/2002 | O'Rourke et al. | |
| 2003/0009533 A1 | 1/2003 | Shuster | |
| 2003/0014521 A1 | 1/2003 | Elson et al. | |
| 2003/0014552 A1 | 1/2003 | Vaitheeswaran et al. | |
| 2003/0023827 A1 | 1/2003 | Palanca et al. | |
| 2003/0028671 A1 | 2/2003 | Mehta et al. | |
| 2003/0037178 A1 * | 2/2003 | Vessey et al. | 709/319 |
| 2003/0058880 A1 | 3/2003 | Sarkinen et al. | |
| 2003/0084248 A1 * | 5/2003 | Gaither et al. | 711/133 |
| 2003/0084251 A1 | 5/2003 | Gaither et al. | |
| 2003/0088604 A1 | 5/2003 | Kuck et al. | |
| 2003/0093420 A1 | 5/2003 | Ramme | |
| 2003/0093487 A1 | 5/2003 | Czajkowski et al. | |
| 2003/0097360 A1 | 5/2003 | McGuire et al. | |
| 2003/0105887 A1 * | 6/2003 | Cox et al. | 709/328 |
| 2003/0115190 A1 | 6/2003 | Soderstrom et al. | 707/3 |
| 2003/0120811 A1 | 6/2003 | Hanson et al. | |
| 2003/0131010 A1 | 7/2003 | Redpath | |
| 2003/0131286 A1 | 7/2003 | Kaler et al. | |
| 2003/0177356 A1 | 9/2003 | Abela | |
| 2003/0177382 A1 | 9/2003 | Ofek et al. | |
| 2003/0187927 A1 | 10/2003 | Winchell | |
| 2003/0191795 A1 | 10/2003 | Bernardin et al. | |
| 2003/0195923 A1 | 10/2003 | Bloch et al. | |
| 2003/0196136 A1 * | 10/2003 | Haynes et al. | 714/13 |
| 2003/0200526 A1 | 10/2003 | Arcand | |
| 2003/0212654 A1 | 11/2003 | Harper et al. | |
| 2003/0229760 A1 | 12/2003 | Doyle et al. | |
| 2004/0003033 A1 | 1/2004 | Kamen et al. | |
| 2004/0024610 A1 * | 2/2004 | Fradkov et al. | 705/1 |
| 2004/0024881 A1 | 2/2004 | Elving et al. | |
| 2004/0024971 A1 * | 2/2004 | Bogin et al. | 711/135 |
| 2004/0045014 A1 * | 3/2004 | Radhakrishnan | 719/328 |
| 2004/0117441 A1 | 6/2004 | Liu et al. | |
| 2004/0128370 A1 | 7/2004 | Kortright | |
| 2004/0167980 A1 | 8/2004 | Doyle et al. | |
| 2004/0168029 A1 | 8/2004 | Civlin | |
| 2004/0181537 A1 | 9/2004 | Chawla et al. | |
| 2004/0187140 A1 * | 9/2004 | Aigner et al. | 709/328 |
| 2004/0205144 A1 | 10/2004 | Otake | |
| 2004/0205299 A1 | 10/2004 | Bearden | |
| 2004/0213172 A1 | 10/2004 | Myers et al. | |
| 2004/0215703 A1 | 10/2004 | Song et al. | |
| 2004/0215883 A1 | 10/2004 | Bamford et al. | |
| 2004/0221285 A1 | 11/2004 | Donovan et al. | |
| 2004/0221294 A1 | 11/2004 | Kalmuk et al. | |
| 2005/0021594 A1 | 1/2005 | Bernardin et al. | |
| 2005/0021917 A1 | 1/2005 | Mathur et al. | |
| 2005/0027943 A1 | 2/2005 | Steere et al. | |
| 2005/0044197 A1 | 2/2005 | Lai | |
| 2005/0044301 A1 | 2/2005 | Vasilevsky et al. | |
| 2005/0055686 A1 | 3/2005 | Buban et al. | |
| 2005/0060704 A1 | 3/2005 | Bulson et al. | |
| 2005/0071459 A1 | 3/2005 | Costa-Requena et al. | |
| 2005/0086656 A1 | 4/2005 | Whitlock et al. | |
| 2005/0086662 A1 | 4/2005 | Monnie et al. | |
| 2005/0125503 A1 | 6/2005 | Iyengar et al. | |
| 2005/0138193 A1 | 6/2005 | Encarnacion et al. | |
| 2005/0160396 A1 * | 7/2005 | Chadzynski | 717/103 |

| | | | |
|---|---|---|---|
| 2005/0180429 | A1 | 8/2005 | Ghahremani et al. |
| 2005/0188068 | A1 | 8/2005 | Kilian |
| 2005/0198199 | A1 | 9/2005 | Dowling |
| 2005/0216502 | A1 | 9/2005 | Kaura et al. |
| 2005/0256880 | A1 | 11/2005 | Nam Koong et al. |
| 2005/0262181 | A1* | 11/2005 | Schmidt et al. ............ 709/200 |
| 2005/0262493 | A1 | 11/2005 | Schmidt et al. |
| 2005/0262512 | A1 | 11/2005 | Schmidt et al. |
| 2005/0268238 | A1 | 12/2005 | Quang et al. |
| 2005/0268294 | A1 | 12/2005 | Petev et al. |
| 2005/0278274 | A1 | 12/2005 | Kovachka-Dimitrova et al. |
| 2005/0278346 | A1 | 12/2005 | Shang et al. |
| 2006/0053112 | A1 | 3/2006 | Chitkara et al. |
| 2006/0053425 | A1 | 3/2006 | Berkman et al. |
| 2006/0059453 | A1 | 3/2006 | Kuck et al. |
| 2006/0064545 | A1 | 3/2006 | Wintergerst |
| 2006/0064549 | A1 | 3/2006 | Wintergerst |
| 2006/0070051 | A1 | 3/2006 | Kuck et al. |
| 2006/0092165 | A1 | 5/2006 | Abdalla et al. |
| 2006/0094351 | A1 | 5/2006 | Nowak et al. |
| 2006/0129512 | A1 | 6/2006 | Braun et al. |
| 2006/0129546 | A1 | 6/2006 | Braun et al. |
| 2006/0129981 | A1 | 6/2006 | Dostert et al. |
| 2006/0143328 | A1 | 6/2006 | Fleischer et al. |
| 2006/0143359 | A1 | 6/2006 | Dostert et al. |
| 2006/0143389 | A1 | 6/2006 | Kilian et al. |
| 2006/0143392 | A1 | 6/2006 | Petev et al. |
| 2006/0143609 | A1 | 6/2006 | Stanev |
| 2006/0143618 | A1 | 6/2006 | Fleischer et al. |
| 2006/0143619 | A1 | 6/2006 | Galchev et al. |
| 2006/0150197 | A1 | 7/2006 | Werner |
| 2006/0155867 | A1 | 7/2006 | Kilian et al. |
| 2006/0159197 | A1 | 7/2006 | Kraut et al. |
| 2006/0167980 | A1 | 7/2006 | Werner |
| 2006/0168646 | A1 | 7/2006 | Werner |
| 2006/0168846 | A1 | 8/2006 | Juan |
| 2006/0206856 | A1 | 9/2006 | Breeden et al. |
| 2006/0294253 | A1 | 12/2006 | Linderman |
| 2007/0150586 | A1 | 6/2007 | Kilian et al. |
| 2007/0156907 | A1 | 7/2007 | Galchev et al. |
| 2007/0266305 | A1 | 11/2007 | Cong et al. |

FOREIGN PATENT DOCUMENTS

| | | |
|---|---|---|
| EP | 1380941 | 1/2004 |
| EP | 1027796 | 6/2004 |
| GB | 2365553 | 2/2002 |
| WO | WO 00/23898 | 4/2000 |
| WO | WO03073204 | 9/2003 |
| WO | WO2004038586 | 5/2004 |

OTHER PUBLICATIONS

"JSR 107: JCACHE", *JSR 107: JCACHE—Java Temporary Caching API, Website*, http://web1.jcp.org/en;jsr/detail?id=107, Nov. 28, 2004., 4.
"What is LDAP?", http://www.gracion.com/server/whatldap.html, (Dec. 7, 2004).
Barrett, Ryan , Barrett, Ryan, *P4 Protocol Specification*, Sep. 2001, p. 1-12.
Casavant, T. L., et al., ""A Taxonomy of Scheduling in General-Purpose Distributed Computing Systems"", Casavant, T.L., and Kuhl, J.G., "*A Taxonomy of Scheduling in General-Purpose Distributed Computing Systems,*" IEEE 14(2):141-154, (1988) XP000039761., (1988), 141-154.
Dandamudi, S. P., "Reducing Run Queue Contention in Shared Memory Multiprocessors", Dandamudi, S.P., "*Reducing Run Queue Contention in Shared Memory Multiprocessors,*" IEEE pp. 82-89 (1997) XP000657329., (1997), 82-89.
Handy, Jim , "The Cache Memory Book", 1998, *Academic Press Inc, 2nd Edition*, pp. 60, (1998), vii-229.
Hennessy, John , et al., "Computer Organization and Design", *1998, Morgan Kaufmann Publishers Inc., 2nd Edition*, pp. 575-576.
Jagannathan, et al., "High-Level Abstraction for Efficient Concurrent Systems", *NEC Research Institute*, Section 5.2, (Mar. 1994), 20.
Oetiker, Tobias , "SEPP Software Installation and Sharing System", *Proceedings of the Twelfth Systems Administration Conference (LISA '98)*, Boston, Massachusetts, (Dec. 6-11, 1998), pp. 253-260.
Pasin, Marcia, et al., "High-Available Enterprise JavaBeans Using Group Communication System Support", Pasin et al., "*High-Available Enterprise JavaBeans Using Group Communication System Support*", pp. 1-6, XP002285985., 1-6.
Polk, Jennifer , et al., "Oracle Database Net Services Administrator's Guide 10g Release 1 (10.1)", URL: http://download-west.oracle.com/docs/cd/B19306_01/network.102/b14212.pdf>; Oct. 2005; retrieved on Apr. 26, 2007., reference No. XP002431369, (Oct. 2005), 1-29.
Rosenberg, David , "Bringing Java to the Enterprise: Oracle on its Java Server Strategy", *IEEE Internet Computing IEEE USA*, vol. 2, No. 2; Database accession No. 5902816, XP002431362; ISSN: 1089-7801, (Mar. 2, 1998), 52-59.
Salo, Timo , et al., "Object Persistence Beyond Serialization", *Increasing Productivity and Reducing Maintenance, Dr. Dobb's Journal, M7T Publ.*, vol. 24, No. 5, May 1999, pp. 5. XP000925486. ISSN: 1044-789X.
Salo, Timo , et al., "Persistance in Enterprise JavaBeans Applications", pp. 3, *JOOP*, Jul. 1999, XP-002142904.
Smits, Thomas , "Unbreakable Java—The Java Server that Never Goes Down", Thomas Smits, "*Unbreakable Java*", The Java Server that Never Goes Down, Nov. 2004, pp. 1-5., Source Date: Nov. 2004. FIP Program made me elect a day so I chose day 1 because I couldn't get to the next screen to load art. Carla Vignola Jul. 10, 2007, (Nov. 2004), 5.
Srinivasan, V. , et al., "Object Persistence in Object-Oriented Applications", *IBMSystems Journal, IBM Corp.*, vol. 36, No. 1, 1997, pp. 11, XP000685709, ISSN: 0018-8670.
Stark, Ian, "CS2 Advanced Programming in Java Note 9", 2002, pp. 1-5.
Tanenbaum, A. S., "Multimedia Operating Systems", Tanenbaum, A.S., *Modern Operating Systems, 2nd Edition*, Upper Saddle River, New Jersey: *Prentice-Hall, Inc.*, pp. 531-578 (2001). *English Translation of: Moderne Betriebssysteme*, vol. 2, pp. 539-617, (2002) XP002385695., (2002), 539-617.
Tuttle, Steven , et al., "Understanding LDAP Design and Implementation", *IBM.com Redbooks*, (Jun. 2004), 1-774.
Werner, Randolf , "Connection of Clients for Management of Systems", U.S. Appl. No. 11/026,604, filed Dec. 30, 2004.
Werner, Randolf , "Interface for External System Management", U.S. Appl. No. 11/027,812, filed Dec. 29, 2004.
Werner, Randolf , "Security for External System Management", U.S. Appl. No. 11/026,323, filed Dec. 29, 2004.
Yue, K. K., et al., "An Effective Processor Allocation Strategy for Multiprogrammed Shared-Memory Multiprocessors", Yue, K.K. and Lilia, D.J., "*An Effective Processor Allocation Strategy for Multiprogrammed Shared-Memory Multiprocessors,*" IEEE 8(12):1246-1258, (1997).
""Design Overview"", *2003 Sun Microsystems*, http://java.sun.com.j2se/1.5.0/docs/guied/jni/spec/design.html, retrieved on Jan. 18, 2008.
"6570P189 OA Mailed Mar. 31, 2008 for U.S. Appl. No. 11/025,378", (Mar. 31, 2008), Whole Document.
"6570P207 FOA Mailed Aug. 17, 2007 for U.S. Appl. No. 11/013,277", (Aug. 17, 2007), Whole Document.
"6570P207 OA Mailed Jan. 7, 2008 for U.S. Appl. No. 11/013,277", (Jan. 7, 2008), Whole Document.
"6570P207 OA Mailed Mar. 12, 2007 for U.S. Appl. No. 11/013,277", (Mar. 12, 2007), Whole Document.
"6570P208 FOA Mailed Aug. 17, 2007 for U.S. Appl. No. 11/013,278", (Aug. 17, 2007), Whole Document.
"6570P208 OA Mailed Feb. 5, 2008 for U.S. Appl. No. 11/013,278", (Feb. 5, 2008), Whole Document.
"6570P208 OA Mailed Mar. 16, 2007 for U.S. Appl. No. 11/013,278", (Mar. 16, 2007), Whole Document.
"6570P216 OA Mailed Jan. 24, 2008 for U.S. Appl. No. 11/024,393", (Jan. 24, 2008), Whole Document.

"6570P217 OA Mailed Feb. 21, 2008 for U.S. Appl. No. 11/027,812", (Feb. 21, 2008), Whole Documents.
"6570P220 OA Mailed Jan. 10, 2008 for U.S. Appl. No. 11/027,387", (Jan. 10, 2008), Whole Document.
"6570P220 OA Mailed Apr. 19, 2007 for U.S. Appl. No. 11/027,387", (Apr. 19, 2007), Whole Document.
"All Classes", http://www.jdocs.com/osche/2.0.2/api/com/opensymphony/oscache/base/allclases-frame.html, (Jan. 2004), 1.
"All Classes, Packages", http://www.jdocs.com/osche/2.0.2/api/overview-frame.html, *OSCache 2.0.2*, (Jan. 2004), 1.
"Caching with IBM WebSphereMQ", *spiritcache, Use Case & Code Example, article*, (Nov. 19, 2004), 1-9.
"Class AbstractCacheAdministrator", http://www.jdocs.com/osche/2.0.2/api/com/opensymphony/oscache/base/AbstractCache.html, (Jan. 2004), 1-11.
"Class Cache", http://www.jdocs.com/osche/2.0.2/api/com/opensymphony/oscache/base/Cache.html, (Jan. 2004), 1-16.
"Class CacheEntry", http://www.jdocs.com/osche/2.0.2/api/com/opensymphony/oscache/base/CacheEntry.html, (Jan. 2004), 1-8.
"Class Config", http://www.jdocs.com/osche/2.0.2/api/com/opensymphony/oscache/base/Config.html, (Jan. 2004), 1-4.
"EP 05027361, European Search Report", (Mar. 28, 2006), Whole Document.
"Failover for Clustered RMI-P4 Remote Objects", *SAP Library*, http://help.sap.com/saphelp_nw04/helpdata/en/f6/4ef11ab3a52f408aa8a133f33d6cf1/cont, (Nov. 2004), 1-3.
"Failover for Enterprise Beans", *SAP Library*, http://help.sap.com/saphelp_nw04/helpdata/en/8f/d6e45953a494499ea1b79ab16321/d2/cont, (Nov. 2004), 1-3.
"Failover System", *SAP Library*, http://help.sap.com/saphelp_nw04/helpdata/en/d7/57af0cce55143be5de3a6e4911186.cont, (Nov. 2004), 2.
"High Availability and Failover", *SAP Library*, http://help.sap.com/saphelp_nw04/helpdata/en/6c/209da105668c45be12f1d9cc412e2b/cont, (Nov. 2004), 1-2.
"Http Sessions and Failover of Web Application", *SAP Library*, http://help.sap.com/saphelp_nw04/helpdata/en/90/044cc585eaba42b649f16181b0fdf/cont., (Nov. 2004), 1.
"Introducing Cache-Forward Architecture", *ObjectStore, paper*, (Jan. 1, 2004), 1-23.
"Java Technology in SAP Web Application Server", *SAP Library*, http://help.sap.com/saphelp_nw04/helpdata/en/0d/a3bbeff62847ae10000000a114084/cont, (Nov. 2004), 1-3.
"Java VineetB-log.java", http://homepage.mac.com/vineetb/iblog/C684524823/, (Dec. 18, 2003), 1.
"JCS Plugin Overview", http://jakarta.apache.org/jcs/Plugins.html, (Jul. 2004), 2.
"JSR 107: JCACHE-Java Temporary Caching API", http://.jcp.org/en/jsr/detail?id=107, (Mar. 20, 2007), 5.
"Load Balancing of the SAP Web As for Java Applications", *SAP Library*, http://help.sap.com/saphelp_nw04/helpdata/en/b5/e8239ef7bd494f896a84625d4b688f/cont., (Nov. 2004), 2.
"Managers—Intro", http://db.apache.org/torque-32/managers-cache.html, (Apr. 11, 2002), 1-4.
"Open Source Cache Solutions in Java", http://java-source.net/open-source/cache-solutions, (Nov. 2004), 1-3.
"OSCache", http;//www.opensymphony.com/oscache, (Nov. 2004), 1.
"OSCache 2.0.2", http://www.jdocs.com/osche/2.0.2/api/com/opensymphony/oscache/base/overview-frame.html, (Jan. 2004), 1.
"OSCache, V 2.0.2 API Specification", http://www.jdocs.com/osche/2.0.2/api/com/opensymphony/oscache/base/overview-sum.html, (Jan. 2004), 2.
"SAP Beefs Up Java Support Capabilities For New NetWeaver", *News Story, (Computerworld)*. http:www.computerworld.com/print-this/2004/0,4814,96558,00.html, (Oct. 11, 2004), 1-2.
"SAP NetWeaver Makes Standard Java Robust", http://www.sap.com/company/press/press.epx?pageview=print&pressid=3069, (Oct. 5, 2004), 1-2.
"SAP Presents New Capabilities for NetWeaver", *InfoWorld*, http://www.infoworld.com/article/04/10/06/HNsapnetweaver_1.html, (Oct. 6, 2004), 1-5.
"Shared disk I/O cache", *IP.com Journal, IP.com Inc., West Henrietta*, XP013014199 ISSN: 1533-0001, (Jan. 29, 2004), 6.
"spiritcache", http://www.spirit-soft.com/index.do?id=30, (Nov. 2004), 1.
"System and Method for Shared Memory/File System Java ObjectGroup Clustered JVM", http://www.priorartdatabase.com/IPCOM/000021597/, (Jan. 2004), 3.
"turbine-jcs-dev", http://www.mail-archive.com/turbine-jcs-dev@jakarta.apache.org/msg00647.html, (Jul. 13, 2004), 1-3.
"Using Rules-based Object Caching: Allocating dataresources for best service levels to profitable customers", *spiritcache, White paper*, (Nov. 2004), 1-8.
"WebLogic RMI Feature and Guidelines", eDocs, http://e-docs.bea.com/wls/docs90/rmi/rmi_api.html, (Nov. 2004), 1-7.
Barker, et al., ""A load balancing framework for adaptive and asynchronous applications"", *Parallel and Distributed Systems, IEEE Transactions on* vol. 15, Issue 2, (Feb. 2004), pp. 183-192.
Bortvedt, Jerry, "Functional Specification for Object Caching Service for Java (OCS4J), 2.0", (Aug. 9, 2000), pp. 1-27.
Bryce, Ciaran, "Isolates: A New Approach to Multi-Programming in Java Platforms", *LogOn Technology Transfer*, Kronerg, Germany, *Experts' Corner*, (May 2004), 7.
Conte, Thomas, "Implementing OSCache", http://www.pas.net.tom.articles/oscache/en/, (Jun. 2002), 1-4.
Czajkowski, Grzegorz, et al., "A Multi-User Virtual Machine", *Paper, Sun Microsystems Laboratories and S3 Lab*, Purdue University, West Lafayette, IN, (2003), 14.
Czajkowski, Grzegorz, "Multitasking without Compromise: A Virtual Machine Evolution", *Paper, Sun Microsystems Laboratories*, (2001), 1-14.
Dagfinn, Parnas, "SAP Virtual Machine Container", https://weblogs.sdn.sap.com/pub/wlg/940, (Oct. 23, 2004), 1-4.
Davies, Robert, "Data Caching: A Prerequisite to the Enterprise Service Bus", *Business Integration Journal*, (Oct. 2003), 41-44.
Dillenberger, D., et al., "Building a java Virtual Machine For Serve Applications: The Jvm On Os/390", *IBM Systems Journal*, vol. 39, No. 1, (2000), 194-210.
Doyle, Patrick, et al., "A Modular and Extensible JVM Infrastructure", *Paper, Edward S. Rogers Sr. Department of Electrical and Computer Engineering*, University of Toronto, Toronto, Ontario, Canada, (Jul. 2002), 14.
Dwarkadas, Sandhya, et al., "Cashmere-VLM: Report Memory Paging for Software Distributed Shared Memory", *Paper, Compaq Cambridge Research Lab*, Cambridge, MA *and Department of Computer Science*, University of Rochester, Rochester, NY, (Apr. 1999), 7.
Ferguson, Renee B., "SAP Preps New NetWeaver Capabilities", eWeek.com, http://www.eweek.com/article2/0,1759,1668146,00.asp, (Oct. 7, 2004), 1-6.
Gontmakher, Alex, et al., "Characterizations for Java Memory Behavior", *Paper, Computer Science Department, Technion*, (1997), 5.
Jagannathan, "High-Level Abstraction for Efficient Concurrent Systems", *NEC Research Institute, Section 5.2*, (Mar. 1994), 20.
Jordan, Mick, et al., "Extending a J2EE Server with Dynamic and Flexible Resource Management", *Paper, Sun Microsystems, Inc, and School of Computer Science*, University of Waterloo, Waterloo, ON, Canada, (Oct. 2004), 20.
Jordan, Mick, et al., "Scaling J2EE Application Servers with the Multi-Tasking Virtual Machine", Paper, Sun Microsystems, SMLI TR-2004-135, Jun. 2004, pp. 1-19, *Paper, Sun Microsystems, SMLI TR-2004-135*, (Jun. 2004), 1-19.
Kuck, Norbert, et al., "SAP VM Container: Using Process Attachable Virtual machines to Provide Isolation and Scalability For Large Servers", *Article, SAP AG*, Walldorf, Germany, (2002), 1-2.
Loosco, Marcelo, et al., "A New Distributed Java Virtual Machine for Cluster Computing", *Notes in Computer Science, Springer-Verlag*, v. 2790, (2003), 1207-1215.
Luck, Greg, "Ehcache 1.0 released", http://www.theserverside.com/news, (Oct. 9, 2004), 1-5.
March, Andres, "OSCache: Change Log", http://www.opensymphony.com/oscache/wiki/Change%20Log.html, (Jan. 18, 2004), 1-11.

Marinescu, Floyd, "SpiritSoft Announces Availability of SpriCache 2.0", http://www.theserverside.com/news/thread.tss?thread_id=18483, (Mar. 21, 2003), 1-5.

Movva, Sudhir, et al., "Transparent Clustered Database Failover Using JAVA", http://www.quest-pipelines.com/newsletter-v5/0604_A.html, (Apr. 2004), 11.

Parnas, Dagfinn, "SAP Virtual Machine Container", https://weblogs.sdn.sap.com/pub/wlg/940, (Oct. 23, 2004), 1-4.

Penchikala, Srini, "J2EE Object-Caching Frameworks", http://www.javaworld.com/javaworld/jw-05-2004/jw-0531-cache_p.html, (May 31, 2004), Whole Document.

Penchikala, Srini, "Object Caching in a Web Portal Application Using JCS", http://www.onjava.com/pub/a/onjava/2003/caching.html, (Dec. 23, 2003), 1-18.

Petev, Petio G., et al., "First in First Out Eviction Implementation", 6570P255 U.S. Appl. No. 11/024,546, filed Dec. 28, 2004, *Office Action mailed Apr. 6, 2007, claims as they stood in the application prior to the mailing of the Office Action an cl*, (Dec. 28, 2004), Whole Document.

Petev, Petio G., et al., "Sized Based Eviction Implementation", U.S. Appl. No. 11/024,591, filed Dec. 28, 2004, *Office Action mailed Apr. 13, 2007, claims as they stood in the application prior to the mailing of the Office Action and claims pr*, (Dec. 28, 2004), Whole Document.

Smits, Thomas, "Unbreakable Java—The Java Server that Never Goes Down", *Article, SAP TechED*, Nov. 2004, San Diego and Munich, (Nov. 2004), 1-5.

Stark, "Concurrent Programming In Java", *CS2 Advanced Programming in Java note 9, S2Bh*, (Jan. 3, 2002), 1-5.

Surdeanu, et al., ""Design and performance analysis of a distributed Java Virtual Machine"", *Parallel and Distributed Systems, IEEE Transactions on* vol. 13, Issue 6, (Jun. 2002), pp. 611-627.

Tullman, Patrick, et al., "Janos: A Java-Oriented OS for Active Network Nodes", *Paper, Flux Research Group*, University of Utah, (Mar. 2001), 14.

Wintergerst, Michael, et al., "Programming Models for Eviction Policies", U.S. Appl. No. 11/025,178, filed Dec. 28, 2004, *Office Action mailed Feb. 1, 2007, claims as they stood in the application prior to the mailing of the Office Action*, (Dec. 28, 2004), Whole Document.

"6570P208 FOA Mailed Aug. 13, 2008 for U.S. Appl. No. 11/013,278 Whole Document", (Aug. 13, 2008).

Bresch, Stefan, "Object-relational mapping system and method for generic relationships", 6570P165 U.S. Appl. No. 10/864,185, filed Jun. 8, 2004—*Final Office Action mailed* Mar. 17, 2008.

Galchev, Galin, "Plug-In Based Caching Architecture Capable of Implementing Multiple Cache Regions Per Application", U.S. Appl. No. 11/024,554, filed Dec. 28, 2004—*Non-Final Office Action mailed* May 28, 2008, 7 pgs.

Nikolov, Nikolai, "Execution of modified byte code for debugging, testing and/or monitoring of object oriented software", 6570P041 U.S. Appl. No. 10/749,617, filed Dec. 30, 2003—*Non-Final Office ction mailed* Apr. 9, 2008.

Petev, Petio, et al., "Least frequently used eviction implementation", U.S. Appl. No. 11/024,565, filed Dec. 28, 2004—*Non-Final Office Action mailed* Jun. 19, 2008, 20.

Petev, Petio G., "Programming Models For Storage Plug-Ins", U.S. Appl. No. 11/024,651, filed Dec. 28, 2004—*Non-Final Office Action mailed* Mar. 14, 2008, 11 pgs.

USPTO, "6570P189 FOA Mailed Aug. 14, 2008 for U.S. Appl. No. 11/025,378", Whole Document.

USPTO, "6570P214 OA Mailed Jun. 27, 2008 for U.S. Appl. No. 11/024,391", Whole Document.

USPTO, "6570P216 FOA Mailed Aug. 6, 2008 for U.S. Appl. No. 11/024,393", Whole Document.

USPTO, "6570P217 FOA Mailed Aug. 19, 2008 for U.S. Appl. No. 11/027,812", Whole Document.

USPTO, "6570P218 OA Mailed Sep. 4, 2008 for U.S. Appl. No. 11/026,323", Whole Document.

USPTO, "6570P222 OA Mailed Apr. 4, 2008 for U.S. Appl. No. 11/024,392", Whole Document.

USPTO, "Non-Final Office Action", U.S. Appl. No. 11/322,057, (6570P221), Whole Document.

*Final Office Action for* U.S. Appl. No. 11/024,554, Mailed Nov. 26, 2008, 15 pages.

*Non-Final Office Action for* U.S. Appl. No. 11/024,393, Mailed Nov. 26, 2008, 29 pages.

*Non-Final Office Action for* U.S. Appl. No. 11/013,278, Mailed Dec. 23, 2008, 28 pages.

*Non-Final Office Action for* U.S. Appl. No. 11/026,604, Mailed Dec. 30, 2008, 18 pages.

*Final Office Action for* U.S. Appl. No. 11/025,514, Mailed Jan. 8, 2009, 10 pages.

*Non-Final Office Action for* U.S. Appl. No. 11/322,596, Mailed Jan. 23, 2009, 12 pages.

*Non-Final Office Action for* U.S. Appl. No. 11/026,604, Mailed Jan. 27, 2009, 18 pages.

*Non-Final Office Action for* U.S. Appl. No. 11/024,924, Mailed Apr. 10, 2008, 16 pages.

*Final Office Action for* U.S. Appl. No. 11/024,924, Mailed Oct. 8, 2008, 9 pages.

*Office Action mailed* Mar. 11, 2008 for U.S. Appl. No. 11/024,591, pp. 15., 15.

*Office Action mailed* Mar. 17, 2008 for U.S. Appl. No. 11/024,546, pp. 18., 18.

*Office Action mailed* Jun. 19, 2008 for U.S. Appl. No. 11/024,565, pp. 22., 22.

*Non-Final Office Action mailed* Oct. 6, 2008 for U.S. Appl. No. 11/119,08.

*Non-Final Office Action for* U.S. Appl. No. 11/024,524, Mailed Nov. 12, 2008, 31 pages.

Tanenbaum, Andrews S., "Structured Computer Organization", Prentice-Hall, Inc., 2nd Edition, (1984), 10-12.

USPTO, "6570P220 OA Mailed Oct. 3, 2008 for U.S. Appl. No. 11/027,387", Whole Document.

Notice of Allowance for U.S. Appl. No. 11/024,392, Mailed Mar. 12, 2009, Whole Document.

Final Office Action for U.S. Appl. No. 11/013,277, Mailed Aug. 7, 2008, Whole Document.

Non-Final Office Action for U.S. Appl. No. 11/013,277, Mailed Jan. 6, 2009, Whole Document.

Notice of Allowance for U.S. Appl. No. 11/024,393, Mailed Apr. 1, 2009, Whole Document.

Office Action for U.S. Appl. No. 11/025,200, Mailed Mar. 24, 2009, Whole Document.

Office Action for U.S. Appl. No. 11/025,514, Mailed Apr. 3, 2009, Whole Document.

Non-Final Office Action for U.S. Appl. No. 11/027,812, Mailed Apr. 2, 2009, Whole Document.

Bortvedt, Jerry, "Functional Specification for Object Caching Service for Java (OCS4J) 2.0", retrieved from http://jcp.org/en/jsr/detail?id=107, (Mar. 2001).

Cheung, KC, et al., "Lightweight Trace and Interpreter for Inter-process Timing Problems", IP.com Journal, IP.com Inc., West Henrietta, NY US, XP013096988, ISSN: 1533-0001, (Jun. 1, 1992), Whole Document.

EPO, "6570P210EP EP Search Report Mailed Jun. 4, 2008 for EP Patent Application 05027365.5-1225", (Jun. 4, 2008), Whole Document.

USPTO, "6570P171 OA Mailed Oct. 29, 2008 for U.S. Appl. No. 11/149,562", Whole Document.

USPTO, "6570P189 FOA Mailed Aug. 22, 2007 for U.S. Appl. No. 11/025,378", Whole Document.

USPTO, "6570P189 OA Mailed Jan. 21, 2009 for U.S. Appl. No. 11/025,378", Whole Document.

USPTO, "6570P189 OA Mailed Apr. 19, 2007 for U.S. Appl. No. 11/025,378", Whole Document.

Viswanathan, D., et al., "Java Virtual Machine Profiler Interface", IBM Systems Journal IBM USA, vol. 39, No. 1, XP002481425, ISSN: 0018-8670, (2000), 82-95.

Wolczko, Mario, "Using a Tracing Java Virtual Machine to Gather Data on the Behavior of Java Programs", Internet Citation, XP002375976, http://research.sun.com/people/mario/tracing-jvm/tracing.pdf, (Retrieved on Apr. 6, 2006), Whole Document.

Non-Final Office Action for U.S. Appl. No. 11/025,525, Mailed Feb. 19, 2009, 15 pages.

Notice of Allowance for U.S. Appl. No. 11/027,387, Mailed Feb. 23, 2009, 8 pages.

Notice of Allowance for U.S. Appl. No. 11/026,323, Mailed Feb. 25, 2009, 19 pages.

*Non-Final Office Action for* U.S. Appl. No. 11/024,924, Mailed Apr. 24, 2009, 15 pages.

*Non-Final Office Action for* U.S. Appl. No. 11/024,394, Mailed Apr. 27, 2009, 33 pages.

*Final Office Action for* U.S. Appl. No. 11/024,524, Mailed Apr. 27, 2009, 21 pages.

Non-Final Office Action for U.S. Appl. No. 11/322,057 dated May 29, 2009; 13 pages.

Notice of Allowance for U.S. Appl. No. 11/013,278, Mailed Jun. 11, 2009, 25 pages.

* cited by examiner

SOCKET-LIKE COMMUNICATION API FOR JAVA

BACKGROUND

1. Field of the Invention

This invention relates generally to data processing. More particularly, an embodiment relates to a system and method for performing data processing using shared memory and socket-like communication application programming interface.

2. Description of the Related Art

Traditional client-server systems employ a two-tiered architecture such as that illustrated in FIG. 1A. Applications 102 executed on the client-side 100 of the two-tiered architecture are comprised of a monolithic set of program code including a graphical user interface (GUI) component, presentation logic, business logic and a network interface that enables the client 100 to communicate over a network 103 with one or more servers 101. A database 104 maintained on the server 101 provides non-volatile storage for the data accessed and/or processed by the application 102.

As is known in the art, the "business logic" component of the application represents the core of the application, i.e., the rules governing the underlying business process (or other functionality) provided by the application. The "presentation logic" describes the specific manner in which the results of the business logic are formatted for display on the user interface. The "database" 104 includes data access logic used by the business logic to store and retrieve data.

The limitations of the two-tiered architecture illustrated in FIG. 1A become apparent when employed within a large enterprise. For example, installing and maintaining up-to-date client-side applications on a large number of different clients is a difficult task, even with the aid of automated administration tools. Moreover, a tight coupling of business logic, presentation logic and the user interface logic makes the client-side code very brittle. Changing the client-side user interface of such applications is extremely hard without breaking the business logic, and vice versa. This problem is aggravated by the fact that, in a dynamic enterprise environment, the business logic may be changed frequently in response to changing business rules. Accordingly, the two-tiered architecture is an inefficient solution for enterprise systems.

In response to limitations associated with the two-tiered client-server architecture, a multi-tiered architecture has been developed, as illustrated in FIG. 1B. In the multi-tiered system, the presentation logic 121, business logic 122 and database 123 are logically separated from the user interface 120 of the application. These layers are moved off of the client 125 to one or more dedicated servers on the network 103. For example, the presentation logic 121, the business logic 122, and the database 123 may each be maintained on separate servers, 126, 127 and 128, respectively.

This separation of logic components and the user interface provides a more flexible and scalable architecture compared to that provided by the two-tier model. For example, the separation ensures that all clients 125 share a single implementation of business logic 122. If business rules change, changing the current implementation of business logic 122 to a new version may not require updating any client-side program code. In addition, presentation logic 121 may be provided which generates code for a variety of different user interfaces 120, which may be standard browsers such as Internet Explorer® or Netscape Navigator®.

The multi-tiered architecture illustrated in FIG. 1B may be implemented using a variety of different application technologies at each of the layers of the multi-tier architecture, including those based on the JAVA 2 PLATFORM ENTERPRISE EDITION™ (J2EE) standard, the Microsoft®.NET™ standard and/or the ADVANCED BUSINESS APPLICATION PROGRAMMING™ (ABAP) standard developed by SAP AG.

For example, in a J2EE environment, such as the one illustrated in FIG. 1C, the business layer 122 is to handle the core business logic of the application having Enterprise Java-Bean™ (EJB or enterprise bean) components with support for EJB containers 134. While the presentation layer 121 is responsible for generating servlets and JAVA ServerPages™ (JSP or JSP pages) interpretable with support for Web containers 132 by different types of browsers at the client 125 via a web server 136 a network 103 (e.g., Internet or intranet).

In recent years, as business application development projects have grown larger and more diversified, integration of business applications in terms of people, information, and processed is becoming increasingly important. SAP® NetWeaver™ was developed and presented by SAP AG with core capabilities to provide a solution for the integration of people, information, and processes.

However, the integration of people, information, and process is resulting in an ever increasing demand for high-level planning, maintenance, and administration, which in turn, requires the underline architecture and environment to conform to, for example, platform independence, inter-process communication, increased security, development versioning, multi-user possibility, shared memory, and efficient class-loading. For example, it would be useful to have an architectural environment that provides increased robustness, improved integration, better monitoring, reduced memory footprint, decreased internal threads, faster session failover, and shared memory.

SUMMARY

A system and method are described for performing data processing using shared memory and socket-like application programming interface. In one embodiment, a plurality of handles is employed and associated with a plurality of processes. The plurality of handles may serve as communication end-points for communication of data. Further, an application programming interface is employed to present the plurality of handles as the application programming interface for sockets for facilitating the communication of data compatible with a programming language. The data is communicated between the plurality of processes via the socket-like plurality of handles.

BRIEF DESCRIPTION OF THE DRAWINGS

The appended claims set forth the features of the invention with particularity. The embodiments of the invention, together with its advantages, may be best understood from the following detailed description taken in conjunction with the accompanying drawings in which:

DETAILED DESCRIPTION

Described below is a system and method for employing performing data processing using shared memory and socket-like communication application programming interface. Throughout the description, for the purposes of explanation, numerous specific details are set forth in order to provide a thorough understanding of the embodiments of the present invention. It will be apparent, however, to one skilled in the art that the present invention may be practiced without some of these specific details. In other instances, well-known structures and devices are shown in block diagram form to avoid obscuring the underlying principles of the present invention.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention will be described below. The various embodiments may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the present invention may be provided as a computer program product, which may include a machine-readable medium having stored thereon instructions, which may be used to program a computer (or other electronic devices) to perform a process according to various embodiments of the present invention. A machine-readable storage medium includes floppy diskette, optical disk, compact disk-read-only memory (CD-ROM), magneto-optical disk, read-only memory (ROM), random access memory (RAM), erasable programmable read-only memory (EPROM), electrically erasable programmable read-only memory (EEPROM), flash memory. The machine-readable medium may include another type of media/machine-readable medium suitable for storing electronic instructions. Moreover, various embodiments of the present invention may also be downloaded as a computer program product, wherein the program may be transferred from a remote computer to a requesting computer by way of data signals.

Figure 1A:
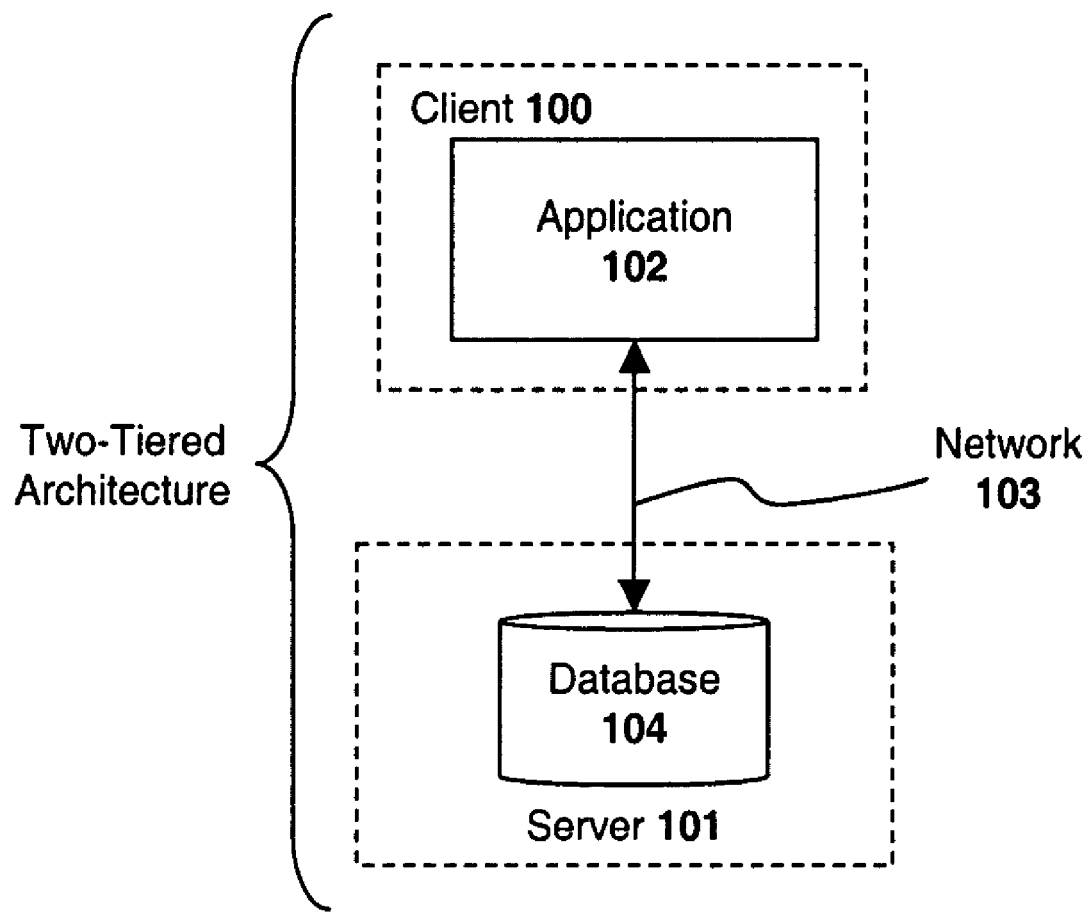
FIG. 1A is a block diagram illustrating a prior art two-tier client-server architecture.
Figure 1B:
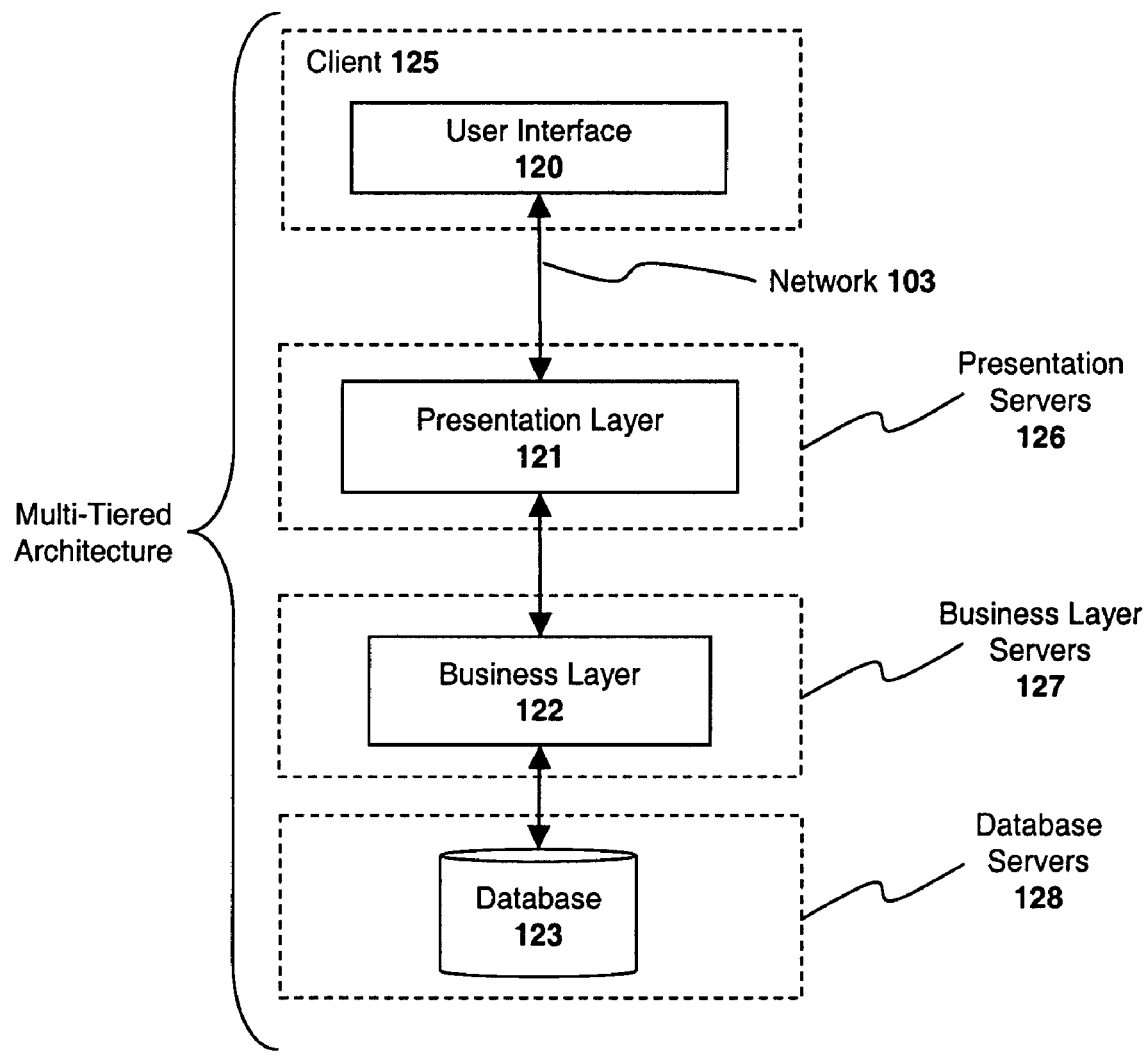
FIG. 1B is a block diagram illustrating a prior art multi-tier client-server architecture.
Figure 1C:
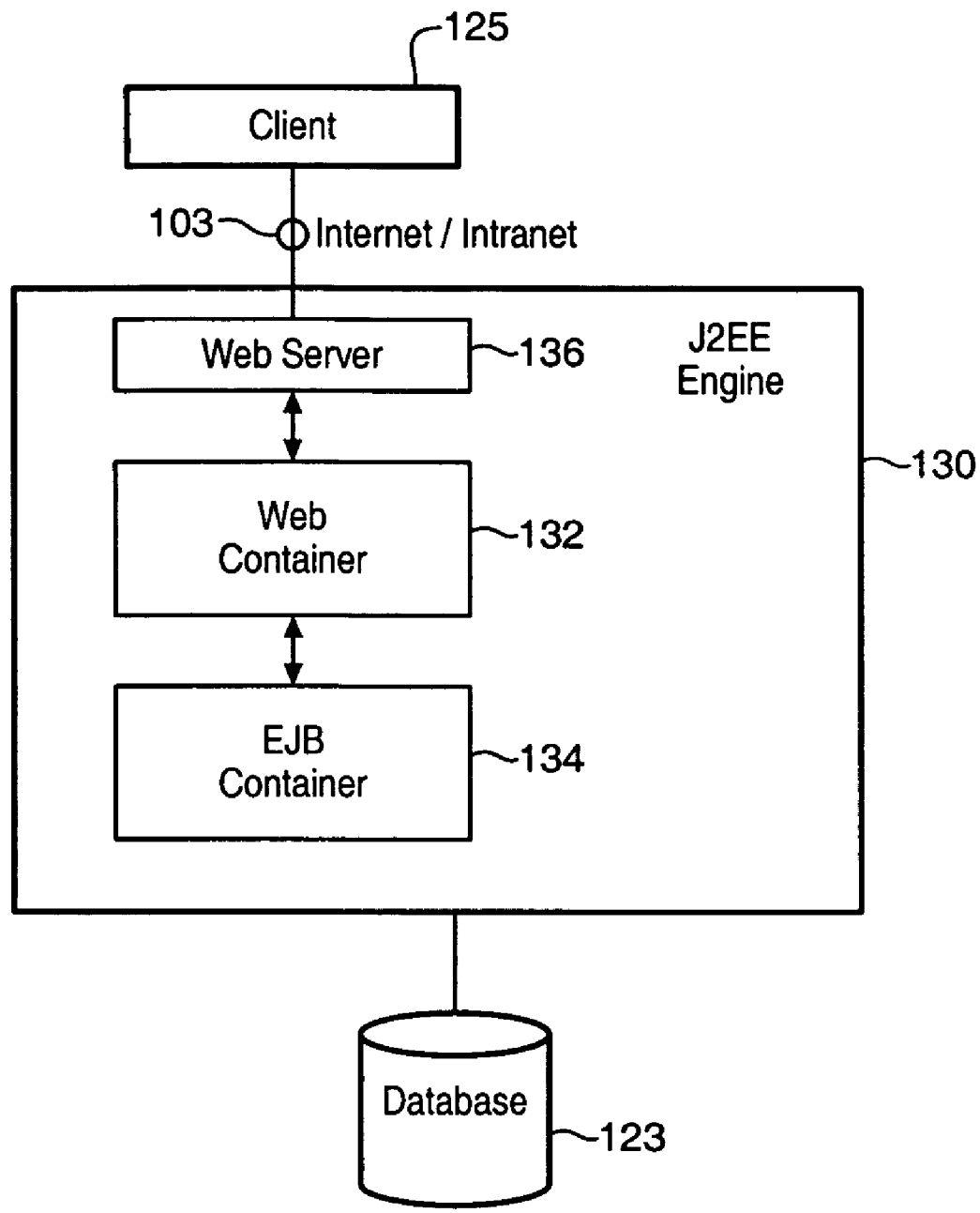
FIG. 1C is a block diagram illustrating a prior art J2EE environment.
Figure 2:
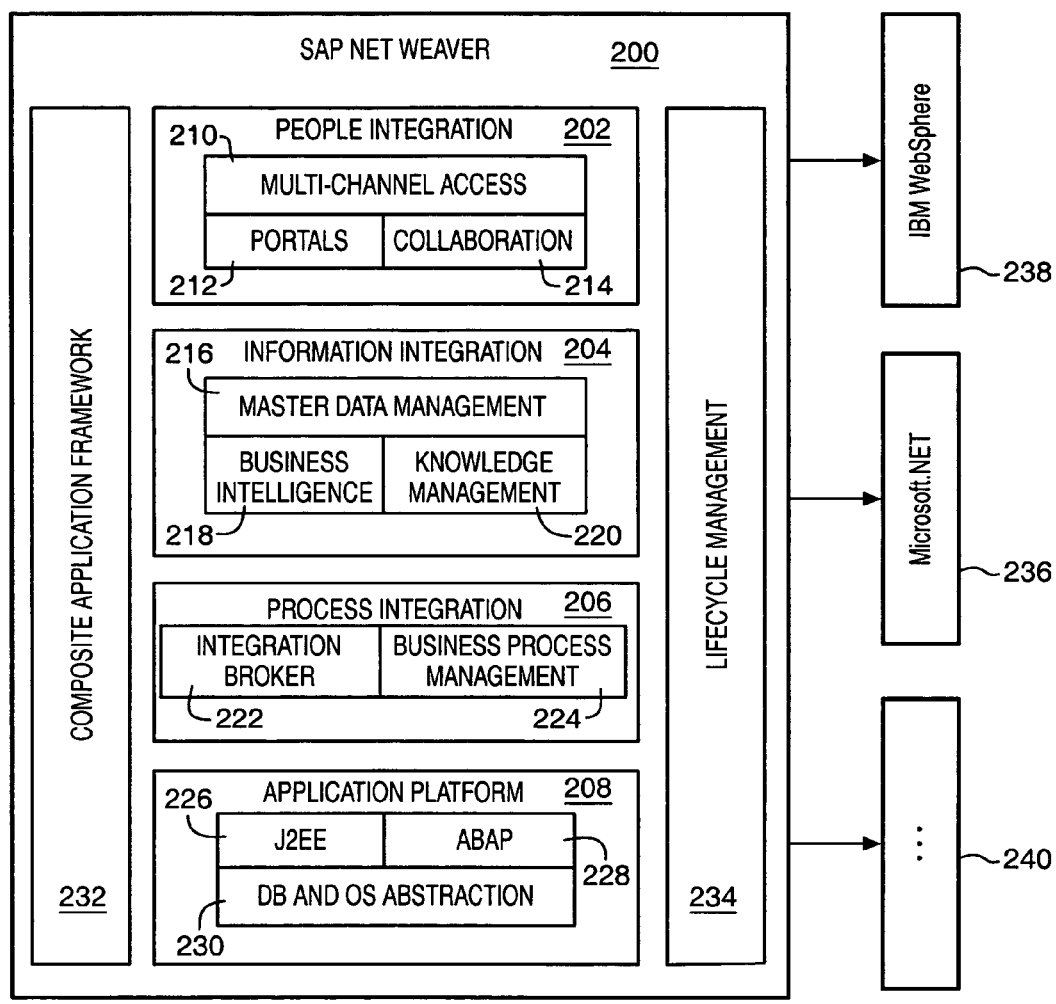
FIG. 2 is a block diagram illustrating an embodiment of the core components of SAP NetWeaver architecture.

FIG. 2 is a block diagram illustrating an embodiment of the core components of SAP NetWeaver architecture 200. As illustrated, the architecture 200 comprises various SAP platforms that are merged together to provide the integration of people, information, and processes in one solution. From an organizational point of view, the architecture 200 includes the following four core areas: people integration 202, information integration 204, process integration 206, and application platform 208. People integration 202 is performed using a portal solution 212 and a platform to work in collaboration 214. Users are provided a multi-channel access 210 to ensure mobility. Examples of the portal solution 212 include SAP Enterprise Portal, SAP Mobile Engine, and Collaboration Package for SAP Enterprise Portal.

Information integration 204 refers to converting information into knowledge quickly and efficiently. Information integration 204 provides efficient business intelligence 216 and knowledge management 220 using SAP products like Business Information Warehouse (BW) and Knowledge Management (KM). Further, consolidation of master data management 218 beyond system boundaries is performed using SAP's Master Data Management (MDM). Process integration 206 refers to optimized process management using integration broker or SAP exchange infrastructure 222 and business process management 224 techniques. Examples of products to perform process integration 206 include Exchange Infrastructure (XI) and Business Process Management (BPM).

Application platform 208 refers to SAP's Web Application Server (Web AS), which is the basis for SAP applications. Web AS, which may be independent of the database and operating system 230, includes a J2EE engine 226 in combination with an already present ABAP engine or instance 228 to further enhance the application platform 208. The architecture 200 further includes a composite application framework 232 to provide various open interfaces (APIs) and a lifecycle management 234, which is an extension of the previous Transport Management System (TMS). As illustrated, the architecture 200 further provides communication with Microsoft .NET 236, International Business Machine® (IBM) WebSphere™ 238, and the like 240.

Figure 3:
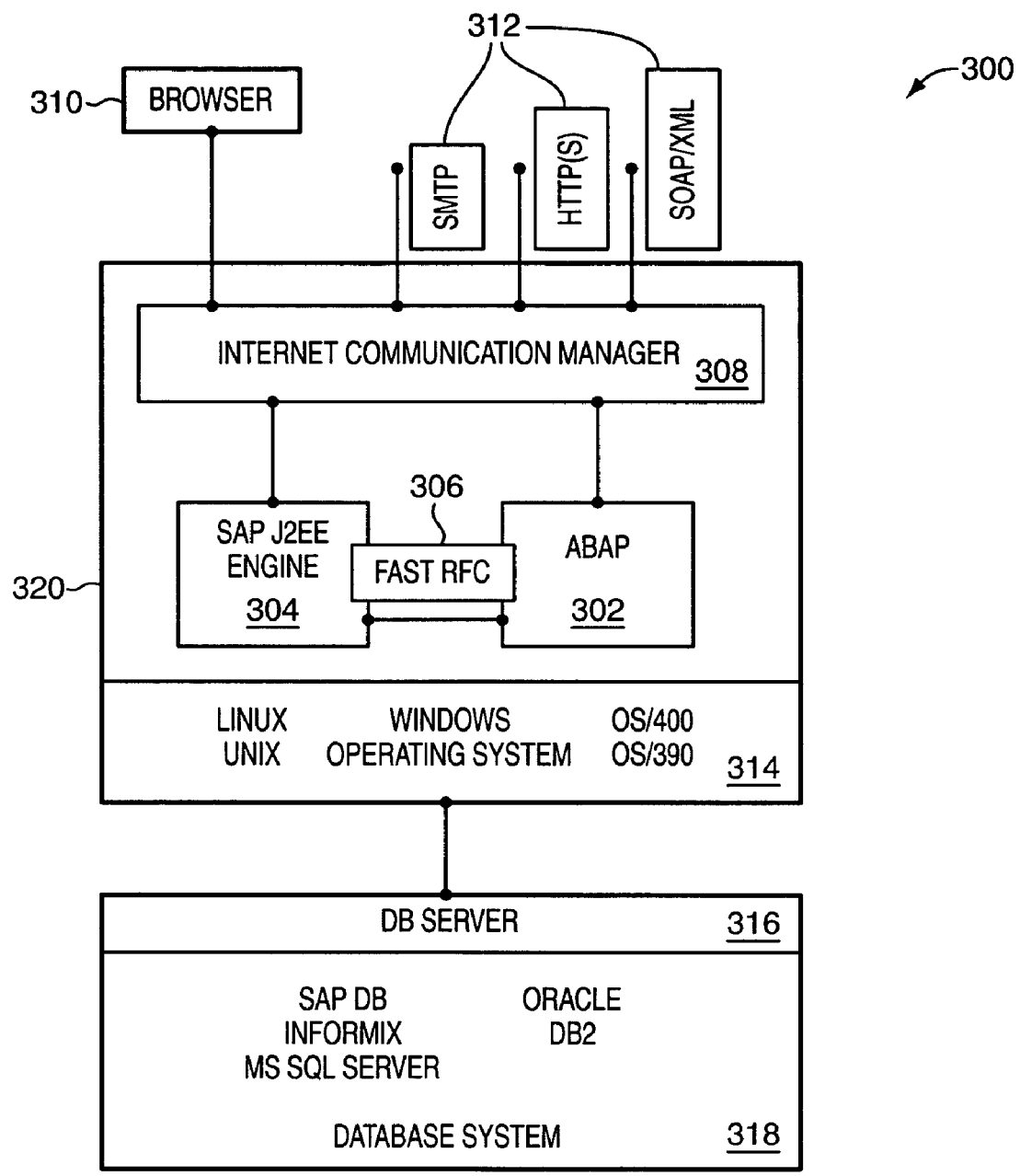
FIG. 3 is a block diagram illustrating an embodiment of an architecture having a Web Application Server.

FIG. 3 is a block diagram illustrating an embodiment of an architecture 300 having a Web Application Server 320. The architecture 300 serves as an application platform (e.g., application platform 208 of FIG. 2) for SAP NetWeaver and other SAP products. As illustrated, the architecture 300 includes a Web AS 320 having an ABAP engine 302, which provides the ABAP development and runtime environment, with the dependability, scalability, and inter-process independence of operating systems 314 and database systems 318. The operating system 314 includes LINUX, UNIX, Windows, OS/390, OS/400, and the like. The database system 318 includes SAP database (SAP DB), Informix, Oracle, DB2, and the like. The database system 318 is based on a database server 316, such as Microsoft Sequential Query Language (MS SQL) server.

The Web AS 320 having the ABAP engine 302 is further enhanced by including a J2EE engine 304. The J2EE engine 304 is in communication with the ABAP engine 302 via a fast Remote Function Call (RFC) connection 306. The two engines 302-304 are further in communication with an Internet Communication Manger (ICM) 308. The ICM 308 is provided for handling and distributing queries (e.g., Internet queries) to various individual components of the architecture 300. The architecture 300 further supports a browser 310, such as Microsoft Internet Explorer, Netscape Navigator, and other modified variations of mobile end devices, such as personal digital assistants (PDAs), pocket computers, smart cell phones, other hybrid devices, and the like. The Web AS 320 also supports various protocols and standards 312, such as HyperText Markup Language (HTML), eXtensible Markup Language (XML), Wireless Markup Language (WML), HyperText Transport Protocol (HTTP(S)), Simple Mail Transfer Protocol (SMTP), Web Distributed Authority and Versioning (WebDAV), Simple Object Access Protocol (SOAP), Single Sign-On (SSO), Secure Sockets Layer (SSL), X.509, Unicode, and the like.

Figure 4:
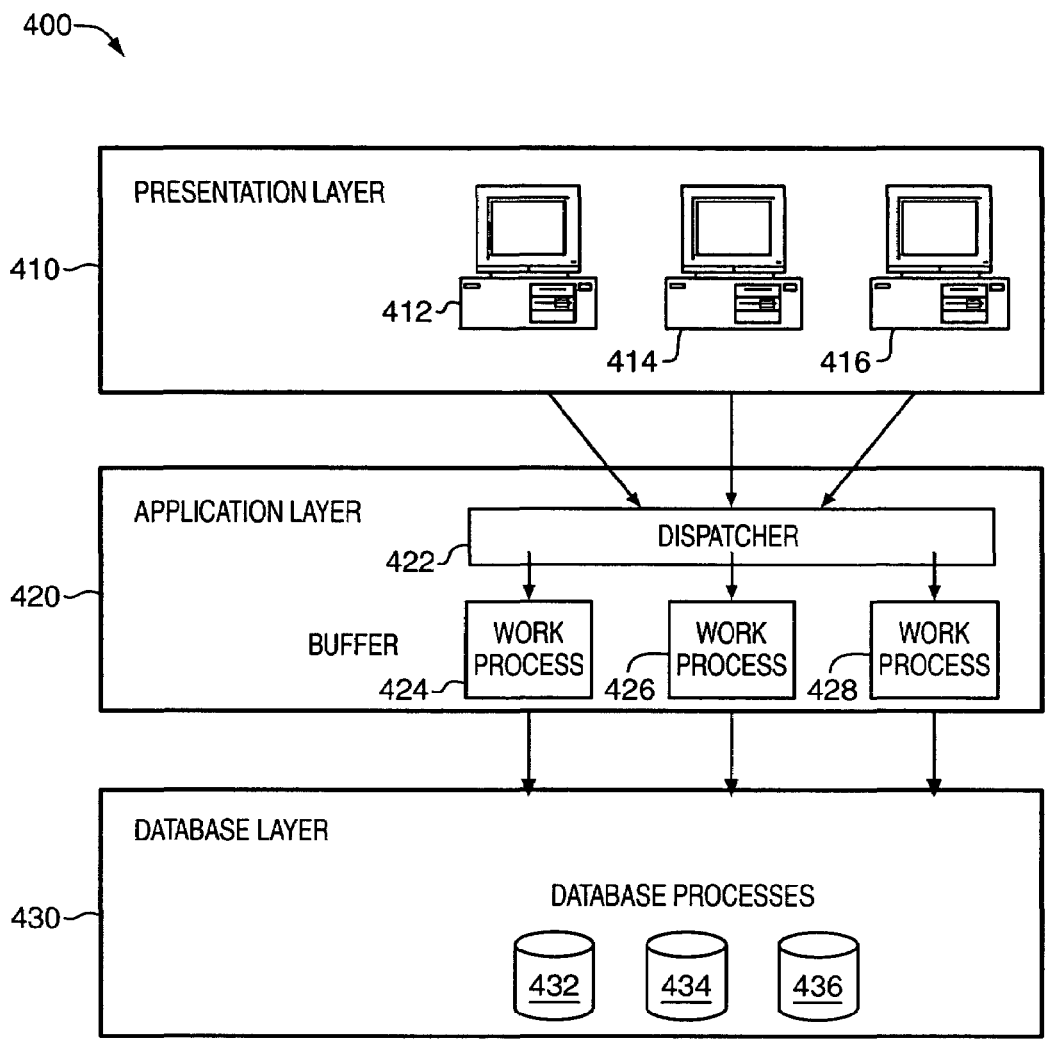
FIG. 4 is a block diagram illustrating an embodiment of a Web Application Server-based architecture having multiple layers.

FIG. 4 is a block diagram illustrating an embodiment of a Web Application Server-based architecture 400 having multiple layers 410, 420, 430. As illustrated, the three layers or levels 410, 420, 430 include a presentation layer (or distributed services or manager or user or client layer) 410, an application agent layer (or agent layer) 420, and a database layer (or instrumentation layer) 430. Various components and elements at each of layer 410, 420, 430 of the architecture 400 are, directly or indirectly, interconnected via a network (e.g., a Local Area Network (LAN)). Alternative embodiments of the architecture 400 may include more or fewer layers.

The presentation layer 410 serves as an interface between various applications and users or clients 412-416. Here, the clients are illustrated as workstations or terminals 412-416 that are used to collect and gather user input and send it to the application layer 420 via a network connection. The network connection may be a wired or wireless connection to a LAN, a Wide Area Network (WAN), a Metropolitan Area Network (MAN), an intranet, and/or the Internet. The terminals 412-416 include personal computers, notebook computers, personal digital assistants, telephones, and the like. In one embodiment in which the network connection connects to the Internet, one or more of the user terminals 412-416 may include a Web browser (e.g., Internet Explorer or Netscape Navigator) to interface with the Internet.

The presentation layer 410 allows the end user to interact with the relevant application using a GUI, such as the SAP GUI, which is a universal client widely used for accessing SAP R/3 or mySAP functions. The GUI works as a browser and offers easy access to various SAP functions, such as application transactions, reports, and system administration functions. The SAP GUI, for example, is available in three different formats, each of which having its own unique selling point and is suited to a particular user. The three formats include SAP GUI for Windows®, SAP GUI for HTML, and SAP GUI for JAVA.

The presentation layer 410 may also includes various management applications, such as a JAVA Management Extension (JMX)-compliant management application, a JMX manager, and/or a proprietary management application. The management applications include one or more graphical management applications, such as a visual administrator, operating to, for example, retrieve and display information received from the application layer 420 and/or the database layer 430. The visual administrator includes a monitor viewer to display such and other information. The monitor viewer includes a GUI-based or Web-based monitor viewer. Management applications include third party tools, such as file systems, to store information.

The application layer 420 includes various application servers and computing devices to perform data processing. The application layer 420 includes a dispatcher 418, which refers to the central process on the application layer 420 for processing transactions. For example, the dispatcher 422 is used to distribute the request load to individual work processes 424-428, organize communication between the work processes 424-428, and establish connection to the presentation layer 410. For example, when a user makes processing entries from his computer using the menu on the presentation layer 410, the entries are converted into a special format (e.g., GUI protocol) and forwarded to the dispatcher 422. The dispatcher 422 then places this request in a dispatcher queue. The queue is then used to free work processes 424-428 that carry out the processing. The application layer 420 may be implemented in accordance with J2EE v1.3, final release Sep. 24, 2001, published on Jul. 18, 2002 (the J2EE Standard). An update of J2EE v1.3 was recently released, on Nov. 24, 2003, as J2EE v1.4. The management techniques described herein are used to manage resources within a "cluster" of server nodes. However, the underlying principles of the invention are not limited to any particular application server architecture.

The database layer 430 is used to optimize the data access without the being dependent on the underlying database and the operating system. The database independence is achieved using open standards, such as JAVA Database Connectivity (JDC). The presentation layer 410 is where the user interacts with the relevant application, which is then executed at the application layer 420, while the data processing 432-436 is managed at the database layer 430. The database layer 430 may include one or more database management systems (DBMS) and data sources. Furthermore, the database layer 430 is compatible with both the ABAP and J2EE environments and allows the two environments to communicate with each other. For example, the functions of ABAP (e.g., Open SQL for ABAP) are transferred to the functions of J2EE (e.g., Open SQL for JAVA) using a variety of APIs.

The database layer 430 may include one or more database servers, EJB servers, old systems, and mySAP components. The clients at the presentation layer 410 may access one or more of the applications via standalone JAVA programs and programs that help access an application via, for example, using Internet Inter-Object Request Broker Protocol (IIOP)/ Common Object Request Broker Architecture (COBRA) written using any number of programming languages (e.g., –C, C, C++, JAVA).

The J2EE environment may also include various J2EE containers that are associated with various J2EE services and APIs, which include JAVA Naming Directory Interface (JNDI), JAVA Database Connectivity (JDBC), J2EE connector Architecture (JCA), Remote Method Invocation (RMI), JAVA Transaction API (JTA), JAVA Transaction Service (JTS), JAVA Message Service (JMS), JAVA Mail, JAVA Cryptography Architecture (JCA), JAVA Cryptography Extension (JCE), and JAVA Authentication and Authorization Service (JAAS). The J2EE services further include EJB_service, serviet_JSP, application_client_service, connector_service to provide (J2EE containers, namely) EJB containers, Web containers, application client containers, and connector containers, respectively.

Figure 5:
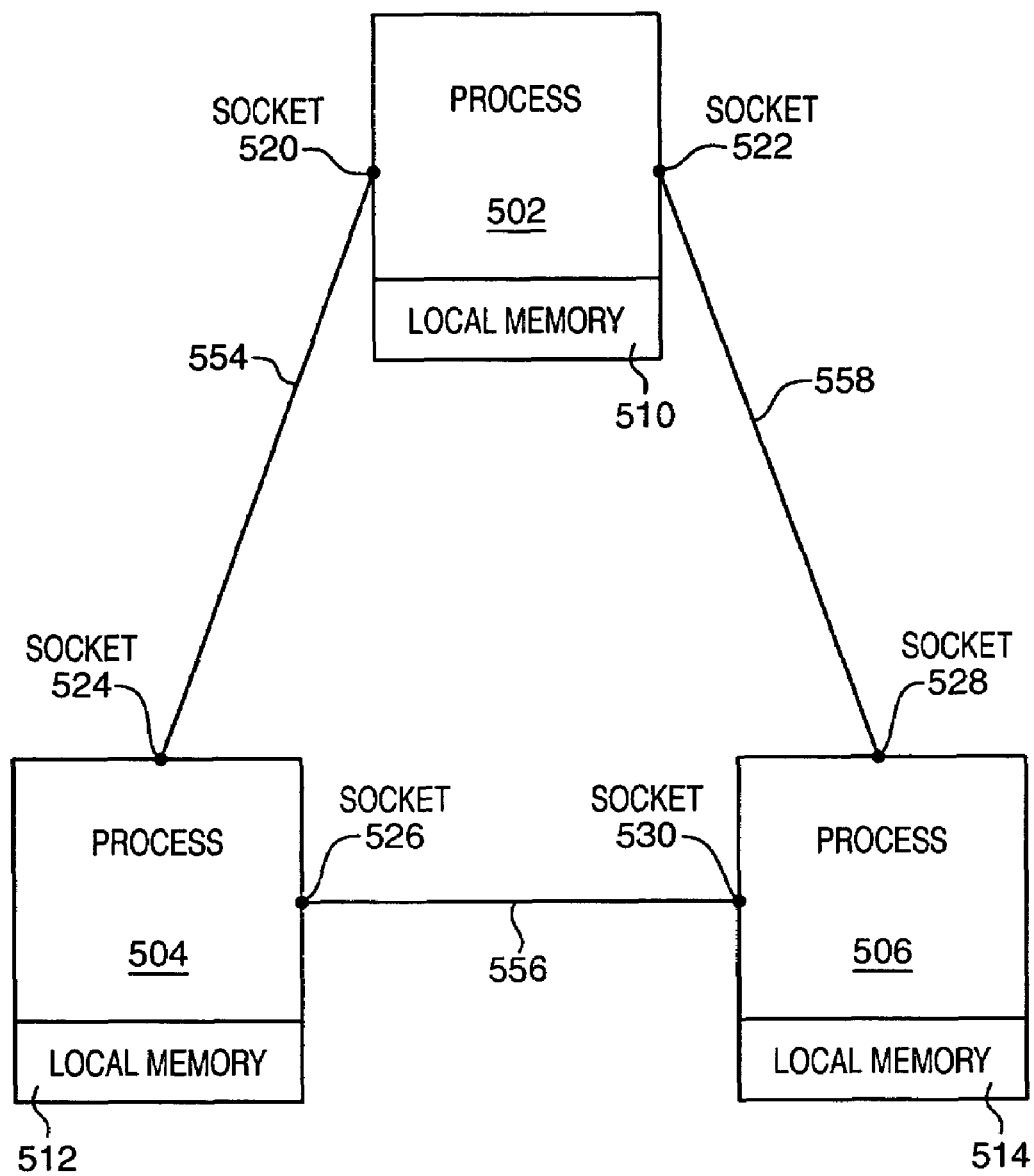
FIG. 5 is a block diagrams illustrating a network-based communication architecture for performing data processing using sockets with an Application Programming Interface for socket communication.

FIG. 5 is a block diagram illustrating a network-based communication architecture 500 for performing data processing using sockets 520-530 with an API for socket communication. Computers typically communicate with each other via one or more networks without the advantage of having common shared memory. In the illustrated network-based communication architecture 500, a local memory 512-514 is assigned to and corresponds with each of the processes 502-506 for access to facilitate data processing. Furthermore, the sockets 520-530 are provided as interfaces that serve as communication mechanism to act as endpoints for sending and receiving data between various processes 502-506. A socket may be associated with one or more processes 502-506 and may exist within a communication domain, an abstraction to bundle properties of processes 502-506 communicating through the sockets 520-530.

As illustrated, in a network-based architecture 500, the basic building blocks for communication are the sockets 520-530 associated with each of the processes 502-506. Sockets 520-530 exist within the communication domain, which serves as an abstraction to bundle properties of processes 502-506 communicating through the sockets 520-530. There are various types of sockets 520-530 that communication architectures 500 can adopt. Some examples of the various types of sockets 520-530 include stream sockets, datagram sockets, raw sockets, and sequenced packet sockets. Stream sockets provide bi-directional, reliable, sequenced, unduplicated flow of data. Message boundaries are not visible for stream sockets. Datagram sockets support bi-directional flow of data. Record boundaries are visible for datagram sockets. Raw sockets allow user processes to be used by normal applications. Sequenced packet sockets are similar to stream sockets, with the exception that record boundaries are preserved.

A socket 520-530 is created with a system call and terminated with a system call once a process 502-506 has finished using the socket. The sockets 520-530 are created and maintained on the OS level of the architecture 500. The sockets 520-530 are used to make the inter-process communication similar to file Input/Output (I/O), primarily because the network protocols are typically more complex than conventional I/O devices. Various networks and protocols (e.g., socket interface, TCP/IP) are used to exchange information in a conventional computer system without the use of a shared memory.

A process 502-506 refers to a task being run by a computer, which is often simultaneously with several other tasks. Many of the processes 502-506 exist simultaneously with each of them taking turns on the central processing unit (CPU). Typically, the processes 502-506 include operating system (OS) processes that are embedded in the operating system. The processes 502-506 take up time as opposed to the memory 510-514 that takes up space. This is typically the case for both the processes that are managed by the operating system and those processes that are defined by process calculi. The processes 502-506 further include specialized processes, such as ABAP work processes and J2EE worker nodes.

The operating system works to keep the processes 502-506 separated and allocates the resources to help eliminate the potential interferences of the processes 502-506 with each other when being executed simultaneously. Such potential interferences can cause system failures. Further, the operating system may also provide mechanisms for inter-process communication to enable processes to interact in safe and predictable manner. Typically, an OS process 502-506 consists of memory (e.g., a region of virtual memory for suspended processes), which contains executable code or task-specific data, operating system resources that are allocated to each of the processes which include file descriptor (for UNIX) and handles (for Windows), security attributes (e.g., process owner and the set of permissions), and the processor state (e.g., content of registers, physical memory addresses), which is stored in the actual registers when the process is executing.

The ABAP work processes and the J2EE worker nodes OS processes 502-506 are considered specialized processes that contain the attributes and behavior of the a typical OS process and are created, scheduled, and maintained by the operating system. For example, the ABAP work processes are specialized in that they are used to execute the ABAP-based transactions, and the J2EE worker nodes are specialized in that they are used to execute the JAVA-based transactions.

Having assigned individualized memory 510-514 to each of the processes 502-506 provides a relatively inefficient computing, which lacks robustness as the processes 502-506 do not communicate with each other and have to access the local memory 510-514 for information or data (e.g., an update or a datagram). Furthermore, such network-based communication using various network connections 554-558 also causes the data processing transactions to be time-consuming and less secure. For example, a typical data processing transaction may include retrieving of data from one local memory 510-514, flowing of the data through various protocols (e.g., Transmission Control Protocol (TCP), User Datagram Protocol (UDP)), addresses (e.g., Internet Protocol (IP) address) and operating systems, before reaching its destination at another local memory 510-514.

Figure 6:
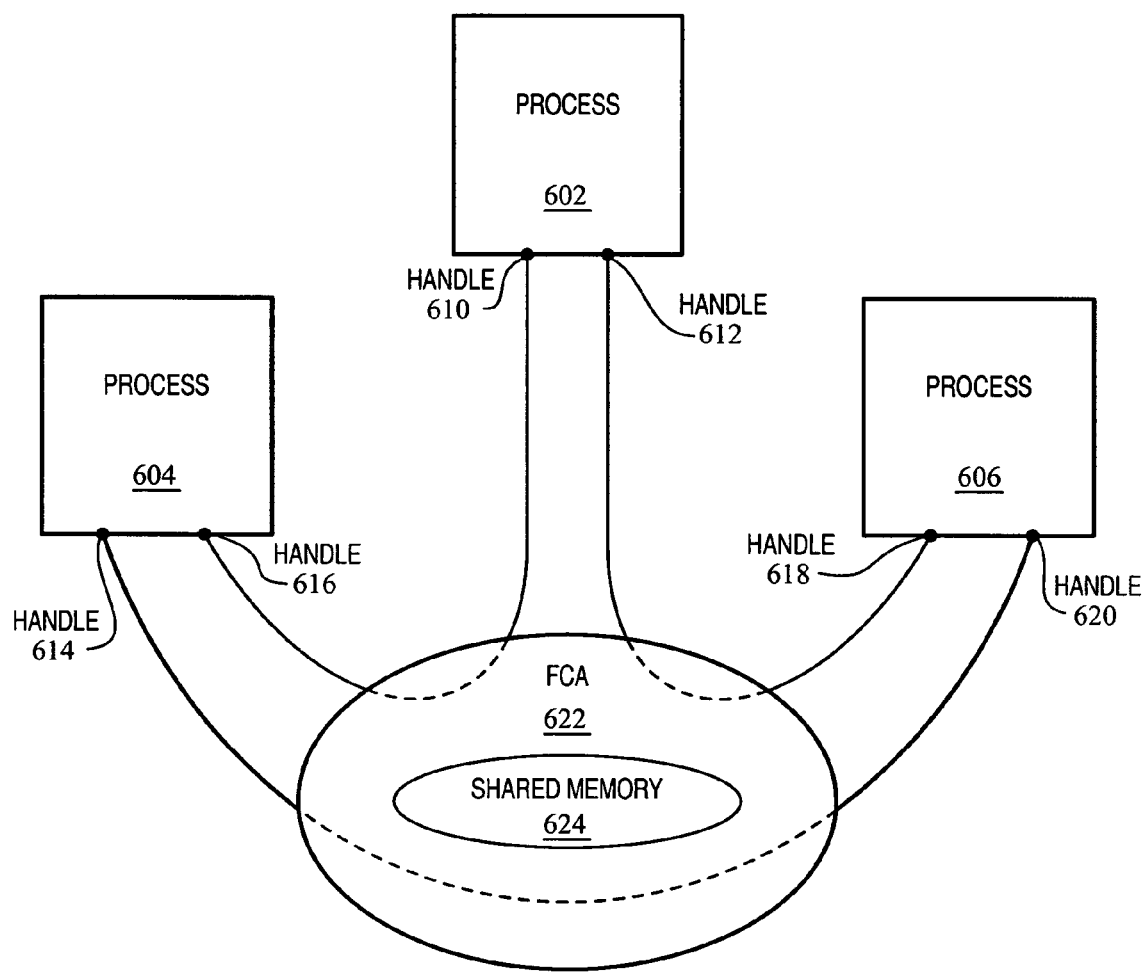
FIG. 6 is a block diagram illustrating an embodiment of a Web Application Server architecture having a Fast Channel Architecture using handles for FCA communication.

FIG. 6 is a block diagram illustrating an embodiment of a Web Application Server architecture (architecture) 600 having a Fast Channel Architecture (FCA) 622 using handles 610-620 for FCA communication. In one embodiment, the FCA 622 includes shared memory 624 to facilitate bi-directional communication between independent processes 602-606. The processes 602-606 include OS processes including ABAP work processes and J2EE worker nodes. The shared memory 624 at the FCA 600 provides a relatively fast, efficient, scalable, reliable, and secure communication between various processes 602-606 on the same physical host. The shared memory-based bi-directional communication utilizes the centralized shared memory 624 for the processes 602-606 to share and access and thus, eliminating the need for having an individualized local memory and for communicating via a network. Furthermore, the use of the shared memory 624 provides for a copy-free communication, high bandwidth, low latency, and fixed size communication buffers.

The processes 602-606 refer to tasks embedded in the operating system. For example, each time a client initiates a program or a document (e.g., opening Microsoft Word®), a request is placed with the operating system regarding commencing the task of opening the document for the client. Several of such processes 602-606 can be performed simultaneously in the CPU by taking turns. Typically, an operating system provides the isolation of such processes 602-606, so they are less likely to interfere with each other, such as when there is a crashed process, such as process 602, none of the other processes, such as processes 604-606, are affected by it and so the potential system failure is avoided. For example, the operating system can increase isolation and robustness by allocating one process 602-606 for each user session, and running a VM for that user session within the allocated process 602-606. However, in some situations (e.g., when there are a large number of user sessions), such operating system scheduling and allocation can add to the system overhead and consume valuable resources, such as time and space.

The processes 602-606 may contain some memory (e.g., a region of virtual memory for suspended processes which contains executable code or task-specific data), operating system resources that are allocated to such processes 602-606 (such as file descriptors, when referring to UNIX, and handles, when referring to Windows), security attributes, such as process owner and the process' set of permissions, and the processor state, such as the content of registers, physical memory addresses, etc.

Various enterprise servers and other large servers are considered request processing engines for processing large numbers of small user requests associated with user sessions. The user requests lead to the creation of processes 602-606, which refer to processing of such user requests. The processing of the requests usually involves the running of a user code (e.g., JAVA servlets or EJBs) in a runtime system (e.g., a JAVA virtual machine (JVM)) executing on a server. In such a server, scalability can be achieved by using multiple threads, such as a multi-threaded VM, to process requests corresponding to a number of user sessions. However, running a large number of user sessions can be relatively cumbersome and wasteful of valuable resources.

In one embodiment, the shared memory 624 can provide a common access and a buffer for the process-attachable VMs, the OS processes 602-606 including ABAP work processes and J2EE worker nodes, as well as dispatcher processes. It is to be noted that the ABAP work processes at the ABAP engine are considered specialized processes that are used for processing the OS processes 602-606 with specialized functionality. The work processes have the attributes and behavior that are also common with the OS processes 602-606 and they may be created, scheduled, and maintained by the operating system. For example, the ABAP work processes are to execute ABAP transactions, while the J2EE worker nodes, also regarded as specialized processes having similar attributes as the processes 602-606, are to execute the JAVA code.

Having introduced the FCA 622 to the architecture 600 facilitates an executable program (e.g., a program running on an OS process 602-606 executing the code) to use the FCA functionalities by binding the FCA library at the time of development and by calling the API for FCA communication in a programming language (e.g., C or JAVA). For example, at runtime, the executable program operates as a process 602-606 in the operating system, such as when a program (e.g., MS Word or Excel) is started several times, which creates several OS processes 602-606 associated with one program that are performed using the FCA functionalities. In one embodiment, the FCA 622 may remain independent of a particular programming language (e.g., ABAP or JAVA) or a particular operating system (e.g., UNIX or Windows). The FCA functionalities may be achieved by coding such functionalities in the program. Stated differently, the program, when running, is executed as an OS process 602-606 and as such it performs various tasks, such as reading/writing data, processing data, and accessing the FCA functionalities.

In one embodiment, having the shared memory 624 helps eliminate the necessity for local memory or individually dispersed memory for performing processes 602-606 and for communicating data. Stated differently, the shared memory 624, as opposed to a local memory using a network connection, is used to create a buffer (e.g., for receiving and transmitting data) for various processes 602-606. A request queue is created at the shared memory 624 and the recently-created request is then placed in the request queue. In one embodiment, the dispatcher then determines the availability of various work processes and, based on such availability, assigns the request to the available work process to handle. The work process performs the corresponding process 602-606 to satisfy the client request. The satisfying of the request may include performing the requested task and providing the requested information or response data back to the client via the shared memory 624. In another embodiment, if the dispatcher is not used, the ICM may possess the functionalities of the dispatcher and assign the request to, for example, the available ABAP work process or J2EE worker node. The ABAP-related requests are sent to the ABAP work processes and the JAVA-related requests are sent to the J2EE worker nodes. Having the shared memory 624 provided by the FCA 622 not only allows a copy-free transmission of the data, but also eliminates the potential of the data being lost due to connection or network failures. Furthermore, using a single shared memory 624 allows the various tasks (e.g., OS processes 602-606) to run on a single local host, which in turn, provides a secure transmission of data. In one embodiment, the shared memory 624 includes memory pipes that are used bi-directionally and are created at startup along with initialization of the FCA 622.

Furthermore, the shared memory 624 at the FCA 622 is low on buffers, which allows for creating and connecting of the queues rather than solely relying on retrying the same queues. Having the shared memory 624 reduces administrative costs, while increasing consistency and easing communication between various processes 602-606. Various entities at the shared memory 624 may include data, datagrams, application update information, strings, constants, and variable.

In one embodiment, the architecture 600 employs FCA handles 610-620 as communication end-points. The handles 610-620 are regarded as an entity at the FCA level for providing communication. Although the handles 610-620 are not sockets as they have different classes, they act socket-like by having similar semantics, which makes application migration from sockets to FCA connections via the handles 610-620 relatively easy. The handles 610-620 are created, maintained, and used at the application layer of the architecture 600 and not necessarily at the OS level where the sockets are created. In one embodiment, the FCA handles 610-620 provide greater performance, reliability, robustness, security, and failover handling, while acting socket-like to ensure low porting effort, high compatibility, and minimal programming effort. The shared memory 624 includes information in blocks to keep track of the number of FCA handles 610-620, buffers, etc. that are being used. Using this information, the FCA 622 can also provide monitoring functionality for monitoring processes and nodes associated with various clients.

The handles 610-620 are associated with one or more processes 602-606 to provide connection to facilitate a link between two processes 602-606. Furthermore, the association of the handles 610-620 with the processes 602-606 is used to an n-tuple that specifies the two endpoints of communication that make up a connection. These functions are based on the client/server model. Further, different handles 610-620 may be used for different purposes.

Figure 7:
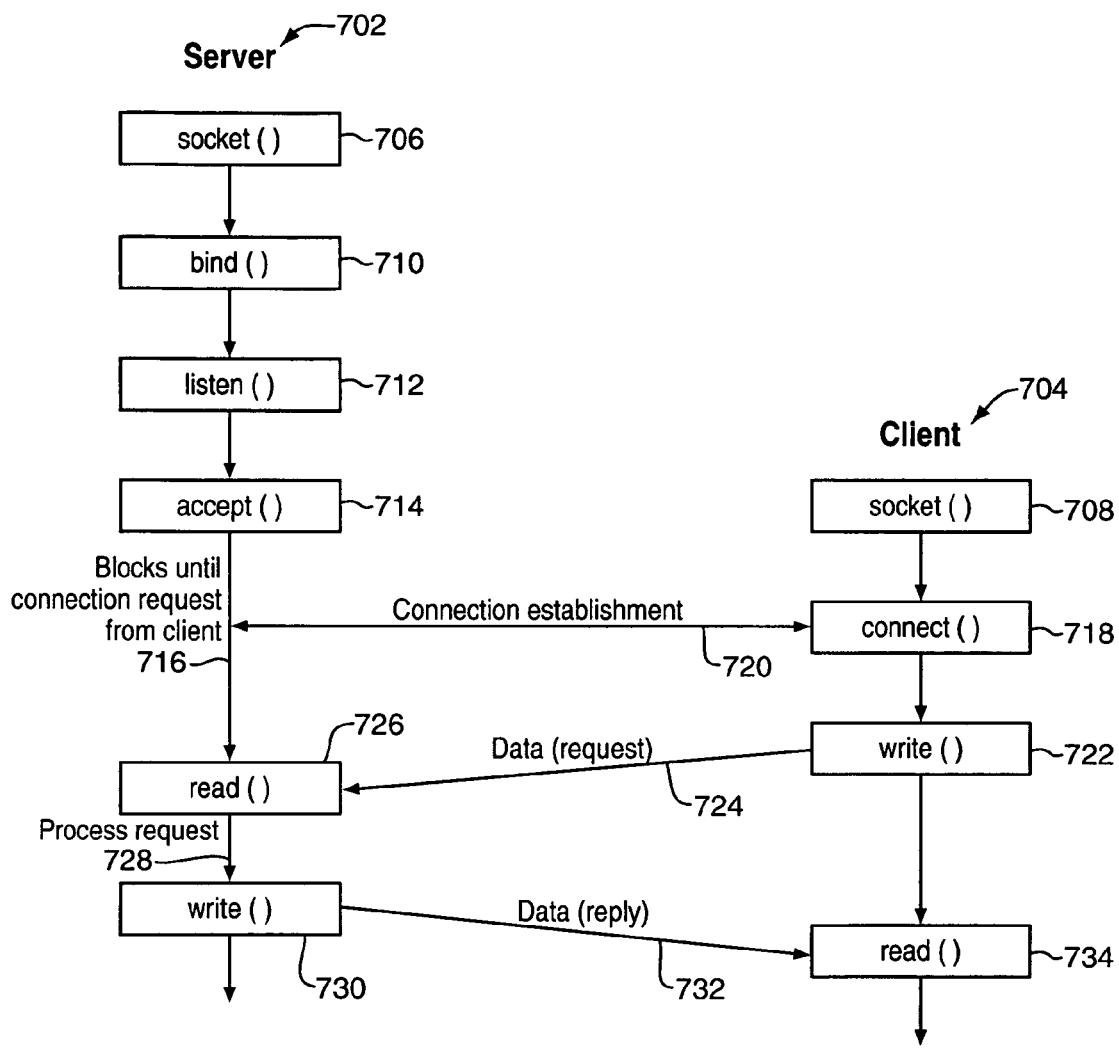
FIG. 7 is a diagram illustrating an embodiment of a transaction sequence for socket calls for C.

FIG. 7 is a diagram illustrating an embodiment of a transaction sequence for socket calls. At the server 702, data structure for a socket is established 706. The socket is then attached to a hostname and port 710. The server 702 then makes the port available to other processes to receive connections by facilitating listening 712. At the client 704, data structure for the socket is established 708. A connection is offered 718 to the server (hostname and port) 702. This is typically done after the server 702 has made the port available by binding 710 and listening 712.

The server 702 accepts the connection 714 offered by the client 704. Stated differently, the server 702 gets a port and a socket to use for this client 704. The server 702 blocks the connection 716 until connection request from the client 704 is received. The connection is established 720 between the server 702 and the client 704. The client 704 writes the request data 722, which results in sending of the request data 724. The reads the request data 726, which results in receiving of the request data. The request is then processed 728 at the server 702. The server 702 then writes the response data 730, which results in sending of the response data 732 to the client 704. The client 704 then reads the response data 734. The connection may then be closed between the server 702 and this client 704 if no longer necessitated.

Figure 8:
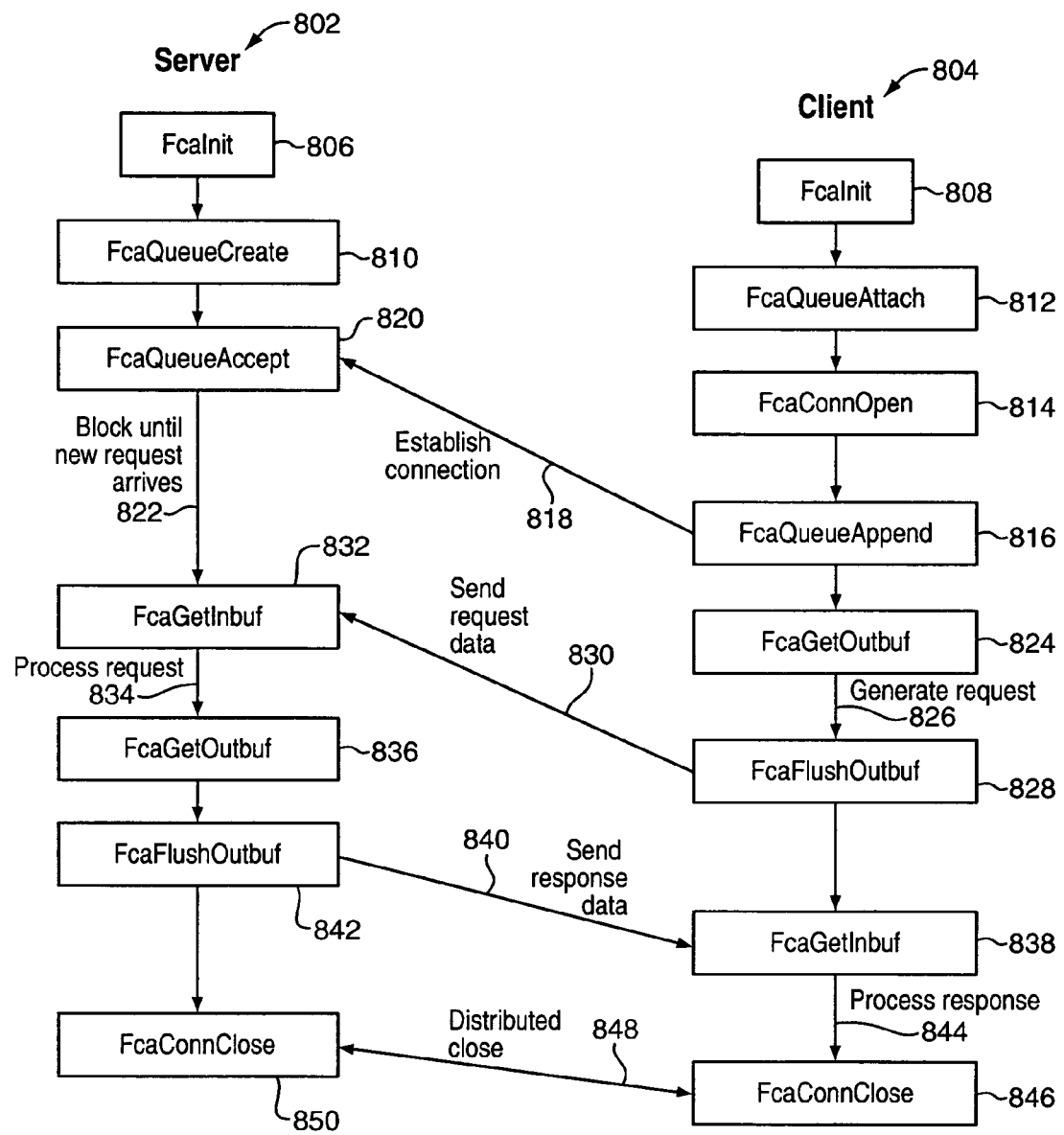
FIG. 8 is a diagram illustrating an embodiment of a transaction sequence for Fast Channel Architecture calls for C.

FIG. 8 is a diagram illustrating an embodiment of a transaction sequence for Fast Channel Architecture calls for C. At the server 802, the FCA library is initialized 806. A new FCA request queue is then created 810 at the server 802. At the client 804, the FCA library is initialized 808 to facilitate FCA access. Then, attachment to the existing request queue (e.g., the newly created request queue) is sought 812. The client 804 opens a new connection 814 to the server 802 to insert new requests into the request queues and to receive responses from the server 802. The request is appended to the request queue 816.

At the sever 802, the new connection request from the client is accepted 820; however, the server 802 block any new connections 822 until a new request has arrived. The connection between the client 804 and the server 802 is established 818. The client 804 gets buffer for generating a request 824 and uses the buffer to generate the new request 826. The request is then flushed 828, which results in sending of the request data 830 to the server 802. The server 802 receives the data 832 and processes the request 834.

The server 802 then obtains buffer to generating a response to the request 836 and uses the buffer to generate the response. The response is then flushed 842, which results in sending of the response data 840 to the client 804. The client 804 receives the response data 838 and processes the response 844. The server 802 and this client 804 propose closing the connection 846, 850 when no longer necessitated, and the connection is closed 848.

Figure 9:
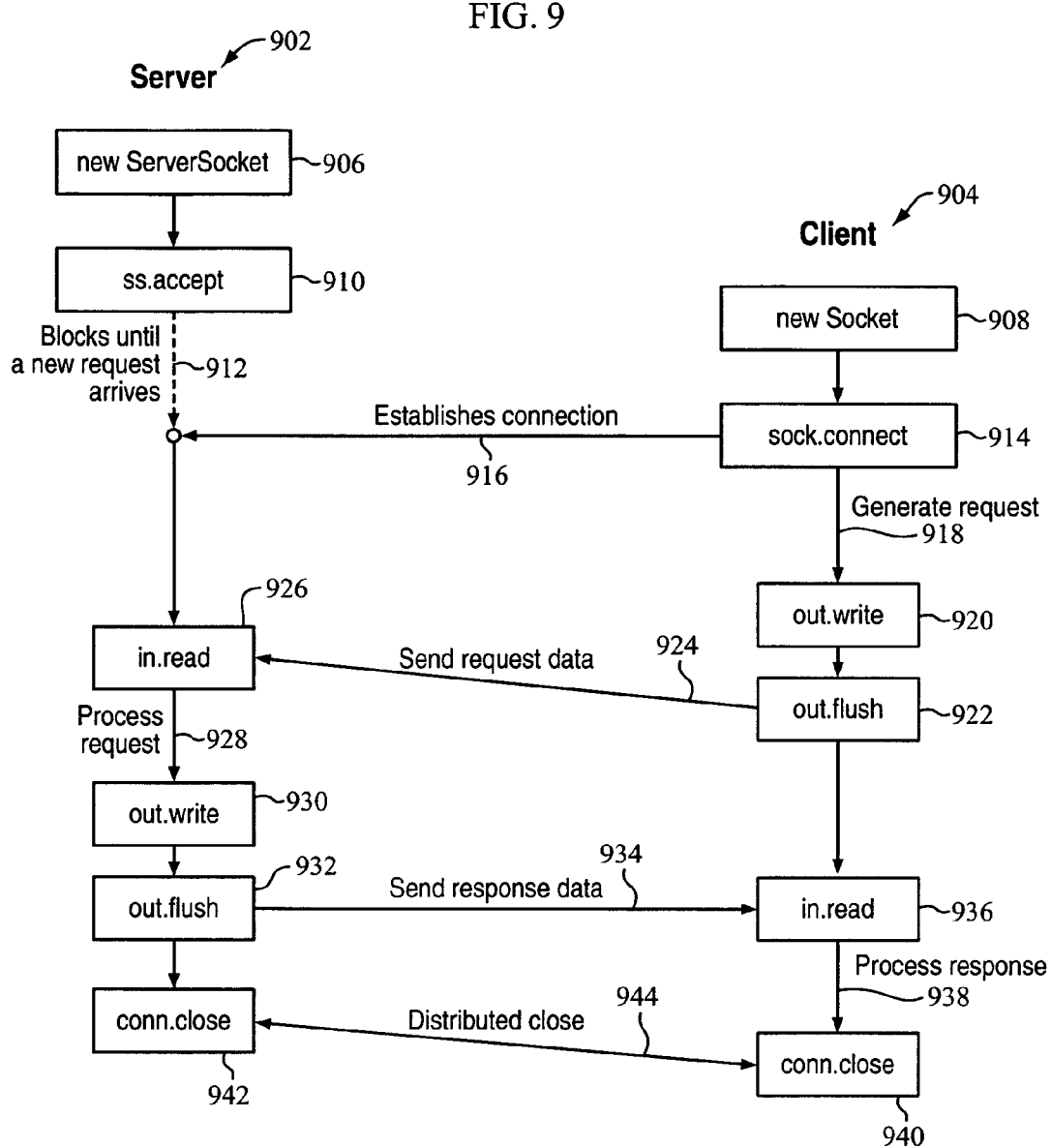
FIG. 9 is a diagram illustrating an embodiment of a transaction sequence between a server and a client for connection-oriented socket communication for JAVA™.

FIG. 9 is a diagram illustrating an embodiment of a transaction sequence between server 902 and a client 904 for connection-oriented socket communication. A new server socket is created 906 and it is bound to the specified port. On the client 904, a new connection socket object is created 908 and prepared for use. The server 904 listens for a connection to be made to this newly created socket and accepts the connection 910, while blocking connection until a new request arrives 912. The client 904 proposes connection 914, which results in establishment of the connection 916. A request is then generated 918 at the client 904 and the request is written out 920 to be transmitted to the server 902. The request is then flushed out 922, which facilitates the sending of the request data 924 to the server 902.

The server 902 reads 926 the request and receives the request data from the client 904. The request is then processed 928 at the server 902. The server 902 writes 930 the response data and flushes it 932 on to the client 904, which results in sending of the response data 934 to the client 904. The client 904 reads 936 the response data. The response is processed 938 at the client 904. Once the request is processed and the response data is received and there is no longer a need to keep the connection open, the client 904 and server 902 propose closing the connection 940-942, which results in closing of the connection 944.

Figure 10:
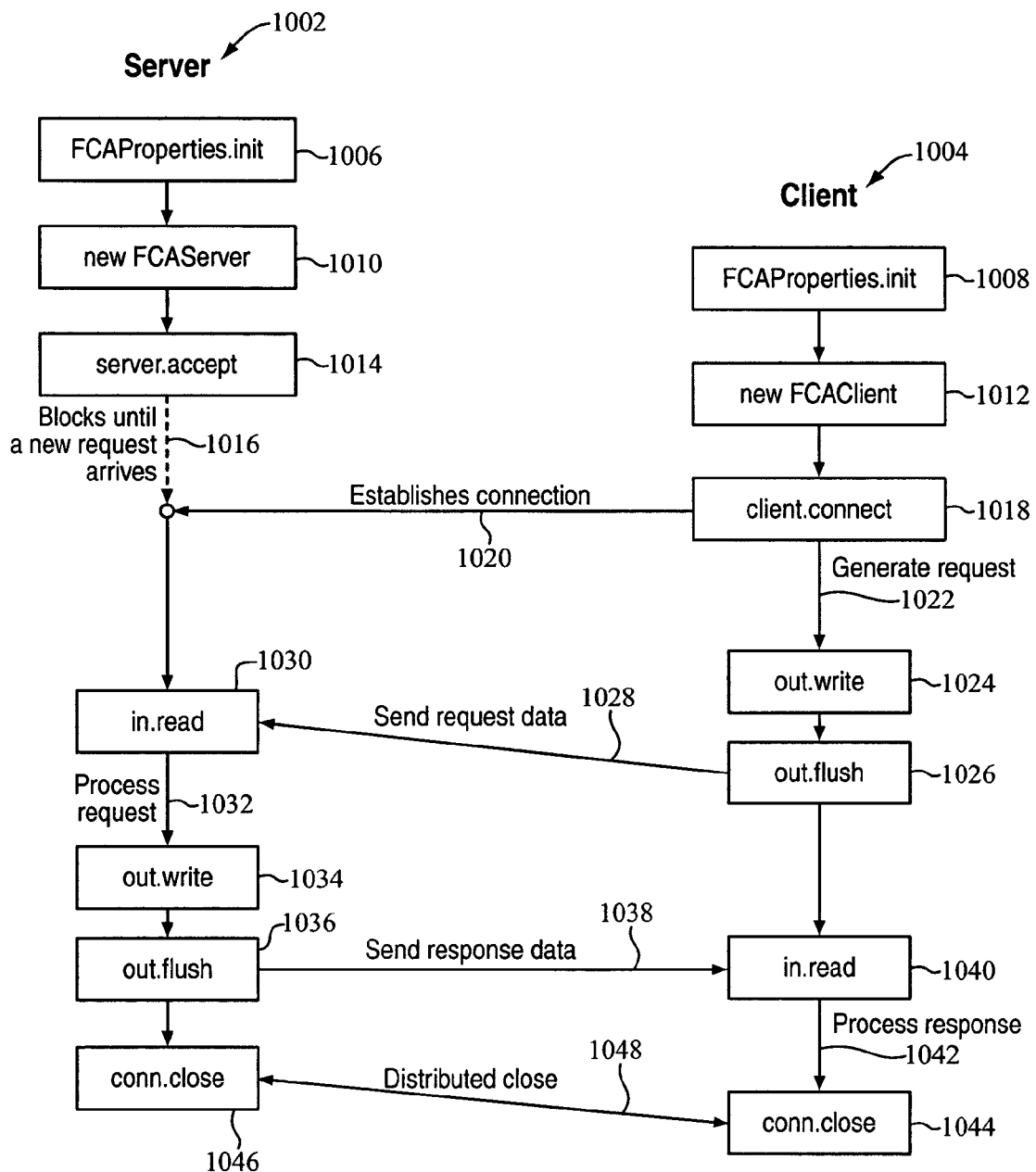
FIG. 10 is a diagram illustrating an embodiment of a transaction sequence between a server and a client using a JAVA API for connection-oriented JAVA Fast Channel Architecture communication.

FIG. 10 is a diagram illustrating an embodiment of a transaction sequence between server 1002 and a client 1004 using a JAVA API for connection-oriented JAVA Fast Channel Architecture (JFCA) communication. It is to be noted that the programming language JAVA is being used here merely as an example and for clarity. The API for FCA communication can be used with other programming languages, such as a C-based API for C, a C++-based API for C++, a C#-based API for C#, a VISUAL BASIC-based API for VISUAL BASIC, a JAVA-based API for JAVA, and the like.

A JAVA API is provided to allow the handles to work as JAVA-based socket-like endpoints to ease the communication of data between various processes. Stated differently, although the shared memory at the FCA is used to provide bi-directional communication of data between various components, particularly between the processes, the JAVA API provides a socket-like interface for programmers and developers using the JAVA programming language. Similar APIs can be provided for other programming languages, such as a C API may be provided for connection-oriented C FCA (C FCA) communication.

In one embodiment, at the server 1002, the FCA properties (e.g., FCA library) are initialized 1006 to prepare and enable FCA access. A new FCA server is created 1010 which refers to creating a new FCA request queue, which is bound a request queue name. Further, the server 1002 is configured to accept 1014 an open connection from the client 1004. The server 1002 listens for a connection to be made to this FCA request queue and prepares to accept 1014 the connection with it is becomes available. The acceptance is blocked 1016 until a new request has arrived. Meanwhile, at the client 1004, the FCA properties are initialized 1008 for preparation and enablement of FCA access. Further, a new FCA client is created 1012 for a attaching with an existing FCA request queue at the server 1002. At the client 1004, a new connection request is opened 1018, which is used to establish connection 1020 with the request queue at the sever 1002.

A request is then generated 1022 at the client 1018. The request data is written 1024 and then the request is flushed 1026 to send the request data 1028 to the server 1002. The request data is read 1030 and received at the server 1002. The request is then processed 1032. Once the request is processed 1032, the response data is written 1034 and response is flushed 1036, which triggers the sending of the response data 1038 to the client 1004. The client 1004 reads the response data 1040 and processed the response 1042. When the connection is not longer required, the server 1002 and the client 1004 propose closing the connection 1044-1046. The connection is then closed 1048.

Figure 11:
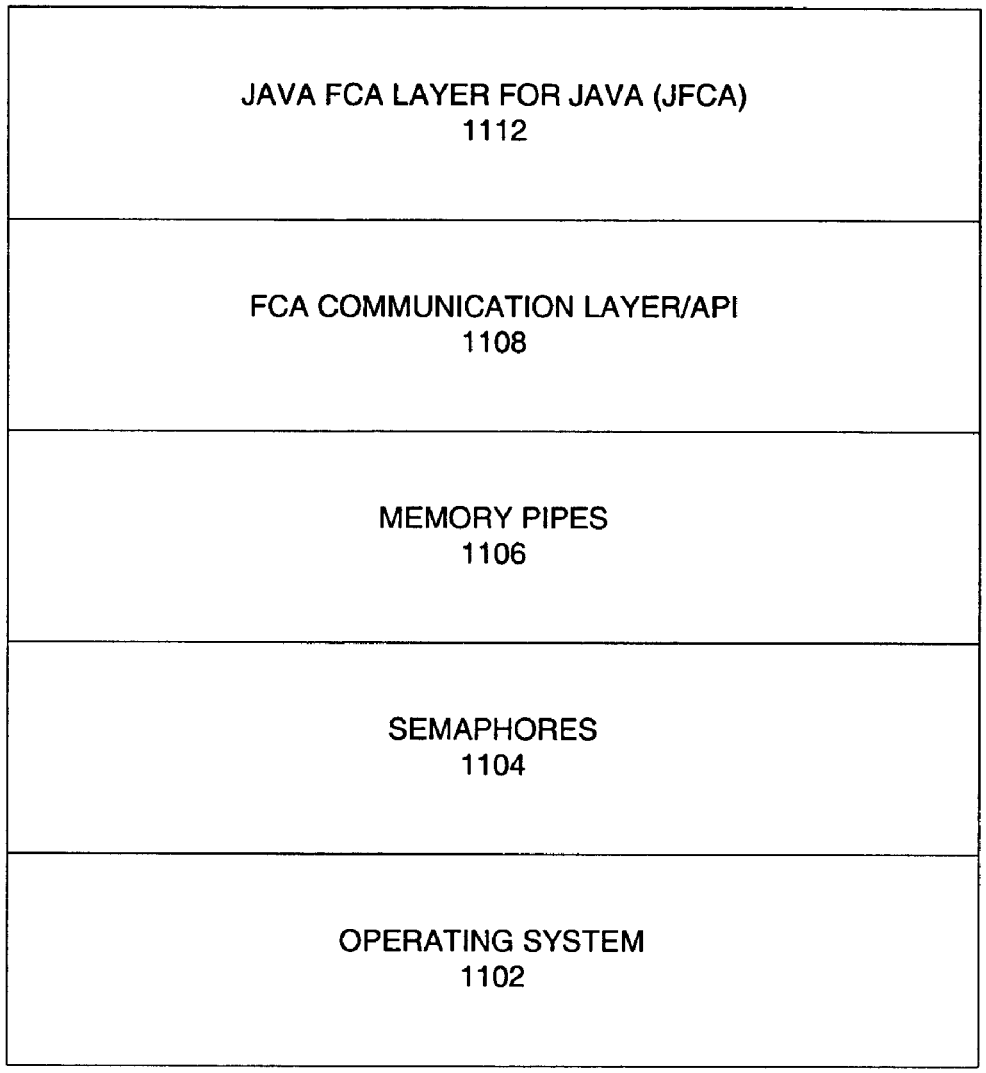
FIG. 11 is block diagrams illustrating embodiments of the layering of the Fast Channel Architecture.

FIG. 11 is a block diagrams illustrating embodiments of the layering of the Fast Channel Architecture 1100. The architecture 1100 is provided to make data processing more efficient and effective by facilitate the enhancement and optimization of communication between various components of the Web AS, particularly the ABAP and J2EE engines. By providing direct and bi-directional communication between the ABAP and J2EE engines and their work processes and worker nodes, respectively, a level of tight, optimized, and fast coupling of the components is achieved using a single application server. Furthermore, the direct and bi-directional communication between the ICM and the J2EE engine is also achieved, which in turn, provides a better communication with external partners (e.g., clients) when receiving incoming requests and transmitting outgoing responses.

In one embodiment, these improvements are achieved by providing a common access to a commonly shared memory using memory pipes 1106 and other necessary layers 1102-1104 and 1108 of the architecture 1100. Such use of the shared memory using the memory pipes 1106 also provides secure and copy-free transfer of data, and decreased network overhead, latency, copy operations, and process switches. Further, to integrate the J2EE engine and the ICM, various protocols, such as RMI, P4, and Telnet, are ported through the ICM, while the shared memory is used as a common access point to transport and communicate data.

In the illustrated embodiment, the architecture 1100 includes a layer of operating system 1102. The operating system 1102 refers to the master control program that runs the computer. The first program is loaded when the computer is turned on, its main part, the kernel, resides in memory at all times. The operating system 1102 sets the standards for all application programs that run on the computer. Further, the applications communicate with the operating system 1102 for user interface and file management operations. Some examples of the operating system 1102 include Windows (e.g., 95, 98, 2000, NT, ME, and XP), Unix (e.g., Solaris and Linux), Macintosh OS, IBM mainframe OS/390, and AS/400's OS/400. Disk Operating System (DOS) is still used for some applications, and there are other special-purpose operating systems as well.

In one embodiment, the semaphores 1104 occupy another layer of the architecture 1100. The semaphores 1104 refer to the shared space for interprocess communications (IPC) controlled by "wake up" and "sleep" commands. For example, the source process fills a queue and goes to sleep until the destination process uses the data and tells the source process to wake up. The semaphores 1104 are provided to work together with the memory pipes 1106, which occupy another layer of the architecture 1100, to facilitate the shared memory. The memory pipes 1106 refer to a fast memory based communication using pipes that are to transport communication data between various components of the architecture 1100.

Using the architecture 1100, these memory pipes 1106 are utilized bi-directionally at the shared memory to relatively efficiently and quickly transport data between various components. The communication between processes and components is facilitated and further enhanced by the FCA communication layer 1108, which include a communication interface or API. The communication layer 1108 works with the semaphores 1104 and the memory pipes 1106 to facilitate direct and bi-directional communication between processes and components and to keep the communication efficient, secure, and fast. Further, the communication layer 1108 works as an API to external inputs, third-party applications, and clients.

In one embodiment, in addition to the layers 1102-1108 described, the FCA 1100 may also include a JAVA FCA layer/API 1112 for JAVA to provide socket-like interface for the Java language. For example, the JFCA layer 1112 is used to provide JAVA-based communication for external applications and to present the FCA handles as socket-like for JAVA. This is also for programmers who use JAVA to make use of the architecture 1100. The JAVA FCA layer/API 1112 is being used here merely as an example and embodiments of the invention are not limited to JAVA. For example, the FCA layer/API 1112 for FCA communication can be used with other programming languages, such as a C-based layer/API for C, a C++-based layer/API for C++, a C#-based layer/API for C#, a VISUAL BASIC-based layer/API for VISUAL BASIC, a JAVA-based layer/API for JAVA, and the like. Regarding handles, the architecture 1100 employs FCA handles as communication end-points, but they are communicated to the programmers as socket-like, which are well-known but are not as efficient as handles, using the JFCA interface layer 1112.

Figure 12:
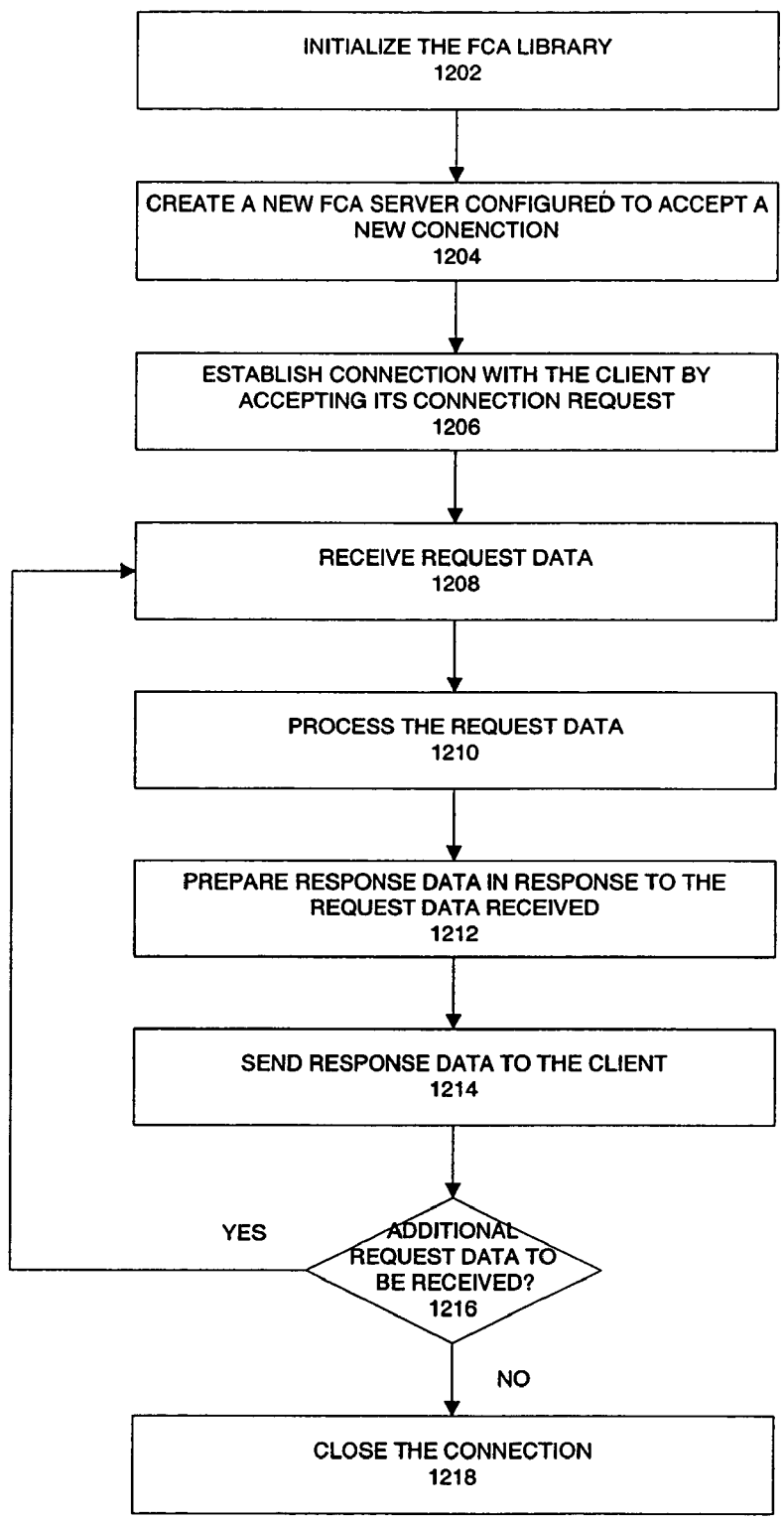
FIG. 12 is a flow diagram illustrating a process for using a JAVA API for connection-oriented JAVA Fast Channel Architecture communication.

FIG. 12 is a flow diagram illustrating a process for using a JAVA API for connection-oriented JAVA Fast Channel Architecture communication. At first, the FCA library is initialized at processing block 1202. The FCA library is initialized both at the server and at the client seeking connection with the server. A new FCA server with connection capabilities is created at the server at processing block 1204. In one embodiment, the connection is then established between the server and client with the server accepting the client's connection request at processing block 1206. The client may then generate a request having request data for the server to process.

At processing block 1208, the server receives the request data from the client. The request data is then processed at the server at processing block 1210. In processing of the request data, a reply having response data is prepared at the server at processing block 1212. The response data is then sent to the client at processing block 1214. At decision block 1216, a determination is made as to whether additional requests are to be received from this client. If yes, the process continues with the server receiving additional request data at processing block 1208. If not, the connection is not longer necessitated and is closed at processing block 1218.

Figure 13:
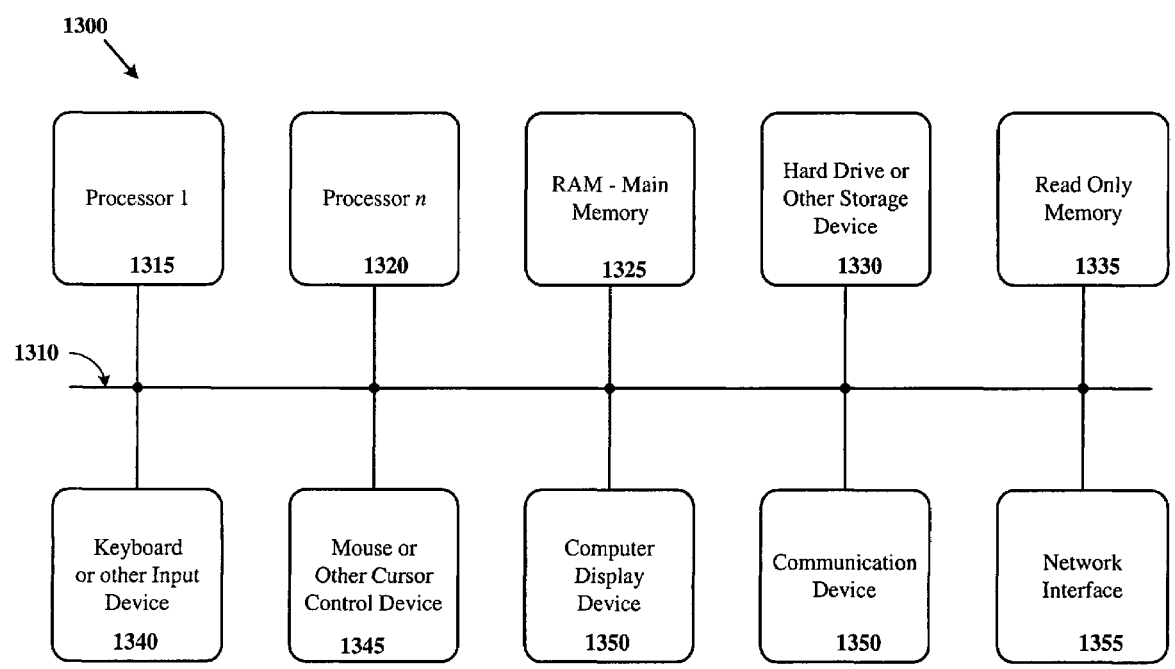
FIG. 13 is an exemplary computer system used in implementing an embodiment of the present invention.

FIG. 13 is an exemplary computer system 1300 used in implementing an embodiment of the present invention. In this illustration, a system 1300 comprises a bus 1310 or other means for communicating data. The system 1300 includes one or more processors, illustrated as shown as processor 1 1315 through processor n 1320 to process information. The system 1300 further comprises a random access memory (RAM) or other dynamic storage as a main memory 1325 to store information and instructions to be executed by the processor 1315 through 1320. The RAM or other main memory 1325 also may be used for storing temporary variables or other intermediate information during execution of instructions by the processors 1315 through 1320.

A hard drive or other storage device 1330 may be used by the system 1300 for storing information and instructions. The storage device 1330 may include a magnetic disk or optical disc and its corresponding drive, flash memory or other non-volatile memory, or other memory device. Such elements may be combined together or may be separate components. The system 1300 may include a read only memory (ROM) 1335 or other static storage device for storing static information and instructions for the processors 1315 through 1320.

A keyboard or other input device 1340 may be coupled to the bus 1310 for communicating information or command selections to the processors 1315 through 1320. The input device 1340 may include a keyboard, a keypad, a touch-screen and stylus, a voice-activated system, or other input device, or combinations of such devices. The computer may further include a mouse or other cursor control device 1345, which may be a mouse, a trackball, or cursor direction keys to communicate direction information and command selections to the processors and to control cursor movement on a display device. The system 1300 may include a computer display device 1350, such as a cathode ray tube (CRT), liquid crystal display (LCD), or other display technology, to display information to a user. In some environments, the display device may be a touch-screen that is also utilized as at least a part of an input device. In some environments, the computer display device 1350 may be or may include an auditory device, such as a speaker for providing auditory information.

A communication device 1350 may also be coupled to the bus 1310. The communication device 1350 may include a modem, a transceiver, a wireless modem, or other interface device. The system 1300 may be linked to a network or to other device using via an interface 1355, which may include links to the Internet, a local area network, or another environment. The system 1300 may comprise a server that connects to multiple devices. In one embodiment the system 1300 comprises a JAVA® compatible server that is connected to user devices and to external resources.

While the machine-readable medium 1330 is illustrated in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine of the system 1300 and that causes the machine to perform any one or more of the methodologies of the present invention. The term "machine-readable medium" shall accordingly be taken to include, but not be limited to, solid-state memories, optical and magnetic media, and carrier wave signals.

Furthermore, it is appreciated that a lesser or more equipped computer system than the example described above may be desirable for certain implementations. Therefore, the configuration of system 1300 may vary from implementation to implementation depending upon numerous factors, such as price constraints, performance requirements, technological improvements, and/or other circumstances.

It should be noted that, while the embodiments described herein may be performed under the control of a programmed processor, such as processors 1315 through 1320, in alternative embodiments, the embodiments may be fully or partially implemented by any programmable or hardcoded logic, such as field programmable gate arrays (FPGAs), TTL logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A method comprising:

integrating processes at an application server via a communication system of the application server, the processes including first processes including specialized processes of an operating system of the application server, and second processes, including specialized processes of the operating system, wherein the first and second processes are independent of each other, the first processes executing first programming transactions via a first programming engine of the application server, and the second processes executing second programming transactions via a second programming engine of the application server, wherein the first transactions are independent of the second transactions, the communication system including a shared memory accessed by the first and second processes using memory pipes to provide a common access to the shared memory, the shared memory to provide duplicate free data to eliminate potential data loss; and facilitating bi-directional and unduplicated communication between the first processes and second processes via the shared memory, wherein the bi-directional and unduplicated communication comprises receiving requests and providing responses in response to the requests, the requests including one or more of Advanced Business Application Programming (ABAP)-related requests and Java-related requests, the first transactions including ABAP transactions, and the second transactions including Java transactions, the communication including one of the first programming engine and second programming engine performing an instruction according to a programming language to employ a handle as a communication end-point, the instruction including semantics of the programming language for accessing a socket, the shared memory serving as a common communication interface for the processes to communicate bi-directionally, wherein at least one socket is associated with each process of the first and second processes, and the sockets are further to serve as a user interface to expose the first and second processes to a user;

receiving at a network communication manager of the application server a client request; and sending the received client request from the network communication manager of the application server to one of the first programming engine and second programming engine via the shared memory, wherein the first processes and second processes include one or more of Web Application Server processes, Unix Application Server processes, Microsoft Windows Application Server processes, Oracle Application Server processes, Java System Application Server processes, and Java 2 Enterprise Edition (J2EE) Application Server processes.

2. The method of claim 1, wherein each of the programming engines is associated with the programming language including one or more of C, C++, C#, Visual Basic, and Java.

3. The method of claim 1, wherein the communication interface comprises one or more of a C-based API, a C++-based API, a C#-based API, a Visual Basic-based API, and a Java-based API.

4. A system comprising:

a processor coupled to a shared memory;

a request-creation tool at a client to generate a request to perform a transaction; and an application server coupled to the client, the application server including a communication system to integrate first processes of the application server and second processes of the application server, wherein both the first processes and the second processes having specialized processes of an operating system of the application server, wherein the first and second processes are independent of each other, the first processes executing first programming transactions via a first programming engine of the application server, and the second processes executing second programming transactions via a second programming engine of the application server, wherein the first transactions are independent of the second transactions, the communication system including a shared memory accessed by the first and second processes using memory pipes to provide a common access to the shared memory, the shared memory to provide duplicate free data to eliminate potential data loss; and the application server further to facilitate bi-directional and unduplicated communication between the first processes and second processes via the shared memory, wherein the bi-directional communication comprises receiving requests and providing responses in response to the requests, the requests including one or more of Advanced Business Application Programming (ABAP)-related requests and Java-related requests, the first transactions including ABAP transactions, and the second transactions including Java transactions, the communication including one of the first programming engine and second programming engine performing an instruction according to a programming language to employ a handle as a communication end-point, the instruction including semantics of the programming language for accessing a socket, the shared memory serving as a common communication interface for the processes to communicate bi-directionally, wherein at least one socket is associated with each process of the first and second processes, and the sockets are further to serve as a user interface to expose the first and second processes to a user, and a network communication manager to receive the client request, wherein the network communication manager further to send the received client request to one of the first programming engine and second programming engine via the shared memory, wherein the first processes and second processes include one or more of Web Application Server processes, Unix Application Server processes, Microsoft Windows Application Server processes, Oracle Application Server processes, Java System Application Server processes, and Java 2 Enterprise Edition (J2EE) Application Server processes.

5. The system of claim 4, wherein each of the programming engines is associated with the programming language including one or more of C, C++, C#, Visual Basic, and Java.

6. The system of claim 4, wherein the communication interface includes one or more of a C-based API, a C++-based API, a C#-based API, a Visual Basic-based API, and a Java-based API a C-based API and a Java-based API.

7. A machine-readable storage medium comprising instructions which, when executed, cause a machine to perform a method comprising:

integrating with a communication system of an application server first processes having specialized processes of an operating system of the application server, and second processes having specialized processes of the operating system, wherein the first and second processes are independent of each other, the first processes executing first programming transactions via a first programming engine of the application server, and the second processes executing second programming transactions via a second programming engine of the application server, wherein the first transactions are independent of the second transactions, the communication system further including a shared memory accessed by the first and second processes using memory pipes to provide a common access to the shared memory, the shared memory to provide duplicate free data to eliminate potential data loss; and facilitating bi-directional and unduplicated communication between the first processes and second processes via the shared memory, wherein the bi-directional and unduplicated communication comprises receiving requests and providing responses in response to the requests, the requests including one or more of Advanced Business Application Programming (ABAP)-related requests and Java-related requests, the first transactions including ABAP transactions, and the second transactions including Java transactions, the communication including one of the first programming engine and second programming engine performing an instruction according to a programming language to employ a handle as a communication end-point, the instruction including semantics of the programming language for accessing a socket, the shared memory serving as a common communication interface for the processes to communicate bi-directionally, wherein at least one socket is associated with each process of the first and second processes, and the sockets are further to serve as a user interface to expose the first and second processes to a user;

receiving at a network communication manager of the application server a client request; and sending the received client request from the network communication manager of the application server to one of the first programming engine and second programming engine via the shared memory, wherein the first processes and second processes include one or more of Web Application Server processes, Unix Application Server processes, Microsoft Windows Application Server processes, Oracle Application Server processes, Java System Application Server processes, and Java 2 Enterprise Edition (J2EE) Application Server processes.

8. The machine-readable storage medium of claim 7, each of the programming engines is associated with the programming language including one or more of C, C++, C#, Visual Basic, and Java.

9. The machine-readable storage medium of claim 7, wherein the communication interface one or more of a C-based API, a C++-based API, a C#-based API, a Visual Basic-based API, and a Java-based API.

* * * * *